(12) United States Patent
Lim et al.

(10) Patent No.: US 6,332,002 B1
(45) Date of Patent: Dec. 18, 2001

(54) MOTION PREDICTION APPARATUS AND METHOD

(75) Inventors: Kyoung Won Lim, Seoul; Hee Sub Lee, Kyunggi-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/182,203

(22) Filed: Oct. 30, 1998

(30) Foreign Application Priority Data

| Nov. 1, 1997 | (KR) | ................................................ | 97-57611 |
| Nov. 1, 1997 | (KR) | ................................................ | 97-57612 |

(51) Int. Cl.⁷ .................................................. H04N 7/12
(52) U.S. Cl. ................................ 375/240.17; 375/240.16; 348/699
(58) Field of Search ...................... 375/240.16, 240.17; 348/699–700, 416.1; 382/236, 238, 240; 358/261.2, 428, 430

(56) References Cited

U.S. PATENT DOCUMENTS

| 5,587,741 | * | 12/1996 | Kim ................................... | 348/416.1 |
| 5,719,630 | * | 2/1998 | Senda ................................... | 348/416.1 |
| 5,731,835 | * | 3/1998 | Kuchibholta ....................... | 348/416.1 |
| 5,731,850 | * | 3/1998 | Maturi et al. ......................... | 348/699 |
| 5,742,710 | * | 4/1998 | Hsu et al. ............................ | 382/236 |
| 6,011,870 | * | 1/2000 | Jeng et al. ......................... | 348/416.1 |
| 6,148,027 | * | 11/2000 | Song et al. ....................... | 375/240.16 |

FOREIGN PATENT DOCUMENTS

| 94-17874 | 7/1994 | (KR) | ................................. | H04N/7/13 |
| 96-16537 | 5/1996 | (KR) | ................................. | H04N/7/32 |
| 97-9418  | 2/1997 | (KR) | ................................. | H04N/7/32 |
| 97-14396 | 3/1997 | (KR) | ................................. | H04N/7/13 |

OTHER PUBLICATIONS

Weiss et al, "Real time implementation of subpixel motion estimation for broadcast applications", IEEE, 1990.*
Akiyama et al, "MPEG2 video codec using image compression DSP", IEEE, 8/1994.*
Charlot et al, "A RISC controlled motion estimation processor for MPEG–2 and HDTV encoding", IEEE, 5/1995.*
Tzeng et al, "An efficient memory architecture for motion estimation processor design", IEEE, 5/1995.*

* cited by examiner

*Primary Examiner*—Vu Le
(74) *Attorney, Agent, or Firm*—Fleshner & Kim, LLP

(57) ABSTRACT

A motion prediction method and apparatus that can reduce an input/output band width during a single-pixel estimation and a half-pixel estimation employing a hierarchical algorithm. In the method and apparatus, a motion in a single pixel unit is repeatedly retrieved in accordance with a position information detected dependently at a plurality of layers with respect to an input image, and the input image is coded and decoded. Then, a motion in a single and half pixel unit for a decoded reconstructed image is estimated at a certain layer in the plurality of layers. The method and apparatus is capable of reducing a calculation amount required for the motion prediction in a single pixel unit as well as reducing an input/output band width during the single-pixel and half-pixel estimation employing the hierarchical algorithm.

13 Claims, 19 Drawing Sheets

REALTED ART

REALTED ART

REALTED ART

REALTED ART

LAYER 2

LAYER 2

REALTED ART

LAYER 1

LAYER 1

REALTED ART

REALTED ART

REALTED ART

REALTED ART

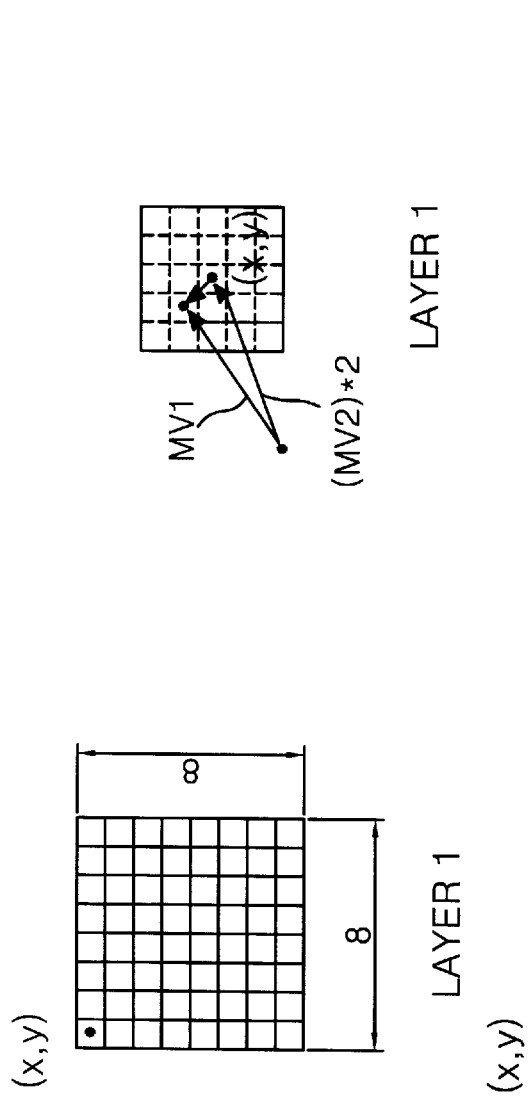
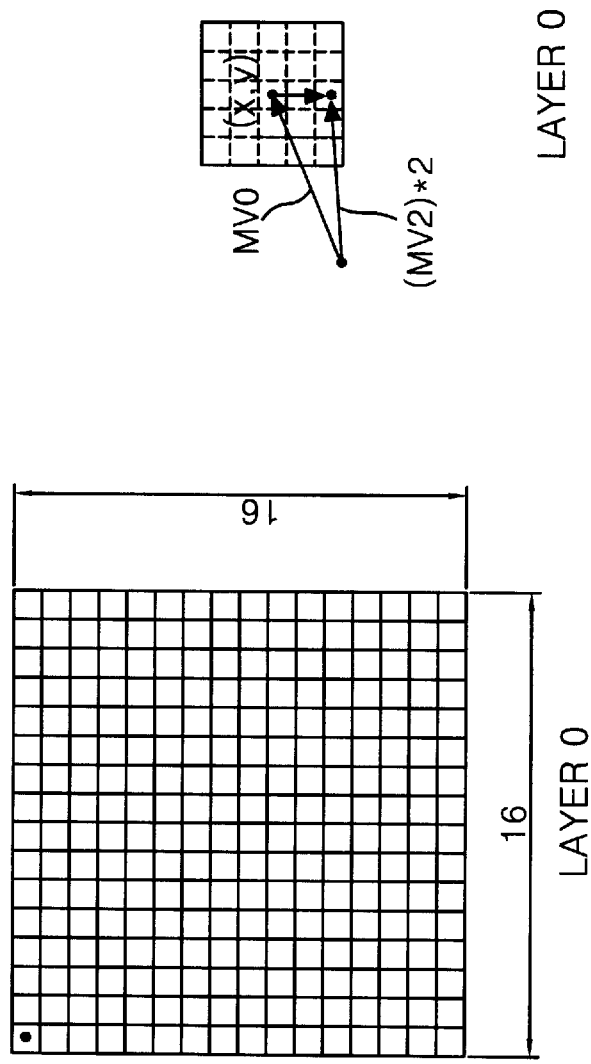
FIG.14C
FIG.14D

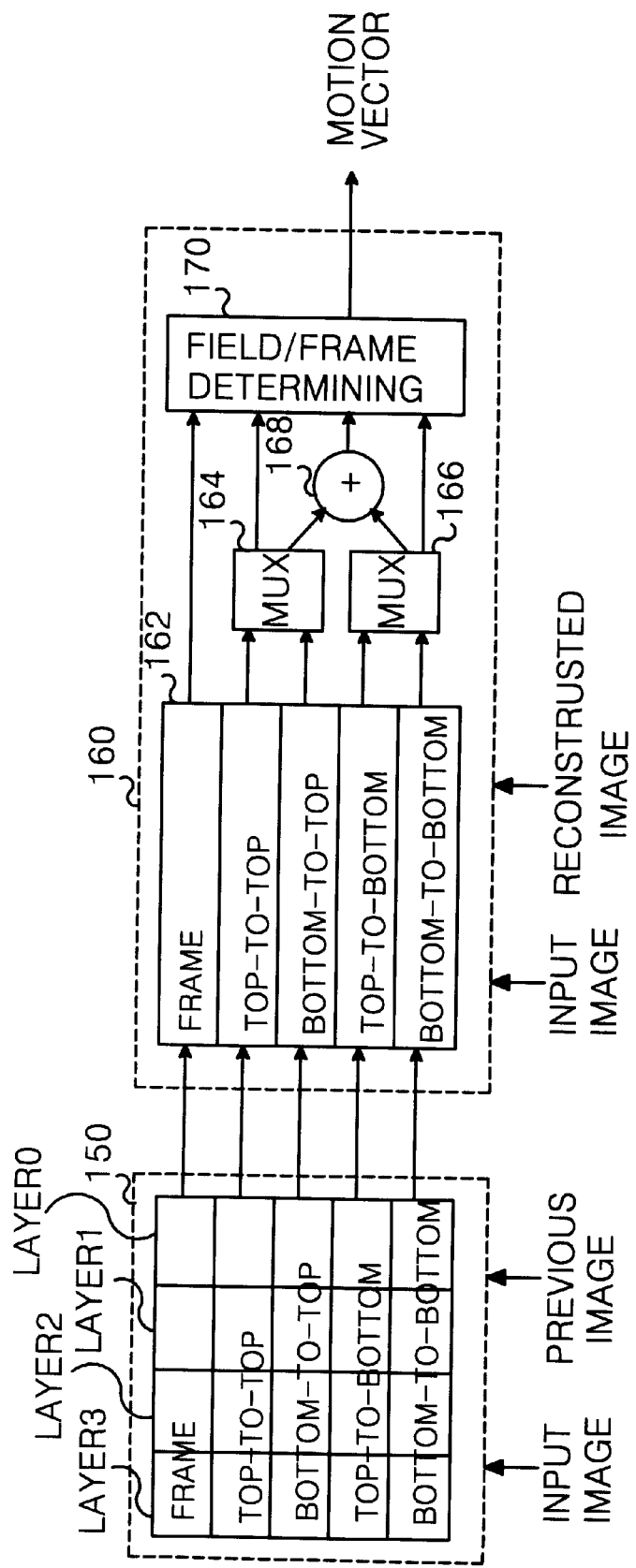

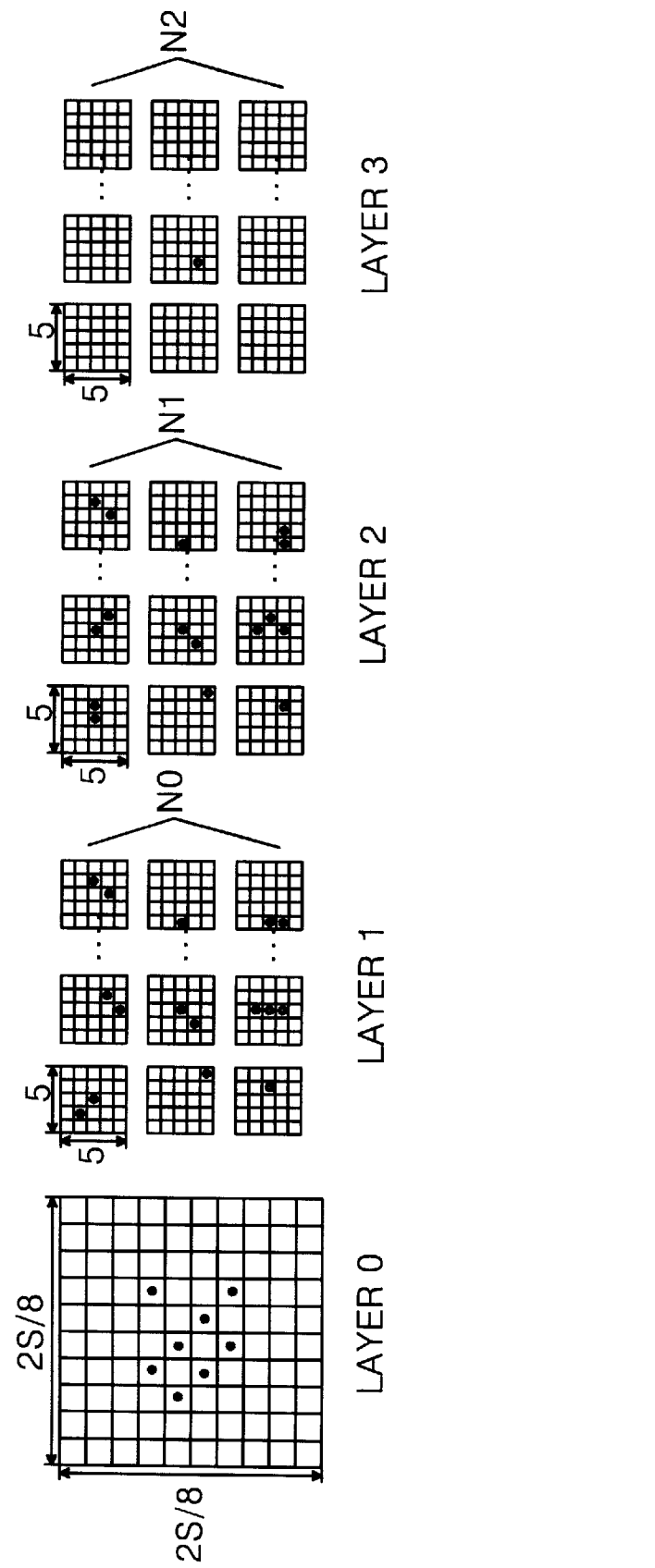

MOTION PREDICTION APPARATUS AND METHOD

BACKGROUND OF THE INVENTION

1. Field of the Invention

This invention relates to a coding technique of a digital image, and more particularly to a motion prediction apparatus and method which is capable of reducing a calculation amount required in a single-pixel and half-pixel motion prediction process as well as an input and output band width when a motion is predicted by employing a hierarchical block matching algorithm.

2. Description of the Related Art

There has been required an information compressing method so as to process a large quantity of information resulting from a tendency of multimedia in the recent communication media. Accordingly, various information compressing technique has been developed. The typical information compressing method includes the MPEG (Moving Picture Experts Group)-2 which is an international standard of the moving picture compressing method.

Generally, the macro block is a basic unit for performing a signal compression in a coder of MPEG-2 system. One macro block consists of a brightness signal(Y) block having 16×16 pixels and a color-difference signal(Cr and Cb) block having 8×8 pixels.

The first step for the image compression is extracting the macro block from a certain input image. To this end, there is required three operations of the color space conversion, the chrominance component decimation and the block partitioning. The color space conversion is an operation for transform the input image into Y, Cr and Cb space so as to reduce the redundancy of red(R), green(G) and blue(B) input from a camera to be converted into a digital shape. The color-difference signal decimation refers to decimating the color-difference signals Cr and Cb in the horizontal and vertical direction because the brightness signal Y representing the contrast of image has such a wide frequency band that it is well recognized visually, whereas the recognition factor in the color-difference signal Cr or Cb representing colors is lower than that in the brightness signal Y. For example, in the case of a format image having a ratio of 4:2:0, the respective decimation factors become a ratio of 2:1. The block partitioning is to divide Y, Cb and Cr images obtained through the color space conversion and the chrominance component decimation mentioned above into sizes suitable for coding them. For example, the brightness signal Y is divided into a 16×16 pixel unit, and each color-difference signal Cr and Cb is divided into a 16×16 pixel unit.

The second step for the image compression is to provide a motion prediction and a compensation for the macro blocks extracted from the entire image regularly. Such motion prediction and compensation are intended to compress an image effectively by omitting a redundant coding process for the adjacent video image in the time base. The conventional motion prediction and compensation process will be explained with reference to a coder of MPEG-2 system shown in FIG. 1 below.

FIG. 1 is a block diagram showing a typical coder of MPEG-2. In FIG. 2, the MPEG-2 system coder includes a frame memory 2 connected to an input line 1, a frame delay 18 for storing a decoded image, and a motion estimator 20 connected commonly to the input line 1, the frame memory 2 and the frame delay 18 to perform an operation for predicting and compensating for a motion of an input image.

In the coder shown in FIG. 1, the frame memory 2 serves to store an image received over the input line 1 in the frame unit. The motion estimator 20 predicts and compensates a motion of the input image. To this end, the motion estimator 20 is comprised of a first motion estimator 22 connected to the input line 1 and the frame memory 2 commonly, a second motion estimator 24 connected to the input line, the first motion estimator 22 and the frame delay 18, and a motion compensator 26 connected to the second motion estimator 24 and the frame delay 18. The first motion estimator 22 detects a position of the most analogous block to the previous image stored in the frame memory 2 with respect to the brightness signal(Y) block in a certain macro block from the image signal received over the input line 1. The detected block position is employed as a reference position for the second motion estimator 24. The second motion estimator 24 receives the input image inputted over the input line 1 and a reconstructed image stored in the frame delay 18 to detect the most analogous block to the brightness signal (Y) block in the macro block with respect to a reference position inputted from the first motion estimator 22 from the reconstructed image. Then, the MPEG-2 system coder transfers the detected position to a decoder, so that the decoder can obtain an image identical to the reconstructed image referred in the coder on a basis of the received position information. The motion compensator 26 extracts the most analogous block to the macro block from the reconstructed image stored in the frame delay 18 on a basis of the final position information generated at the second motion estimator 24.

The MPEG-2 system coder further includes a subtractor 4 connected commonly to the frame memory 2 and the motion compensator 26 to generate a difference image between the previous image and the estimated reconstructed image, a coder 34 connected to the subtractor 4 to code the difference image, a decoder 36 connected to the coder 34 to reconstruct the coded difference image, and an adder 16 connected to the decoder 36 and the image compensator 26 to add the reconstructed difference image and the estimated image and output the added image to the frame delay 18. Moreover, The MPEG-2 system coder includes a variable length coder (VCL) and a buffer 32 that are connected, in series, to the coder 34, and a bit rate controller 10 for controlling a bit generation rate by adjusting quantizing step sizes Qp of a quantizer 8 and a dequantizer 12 with reference to the characteristic of the input image stored in the frame memory 2 and the data quantities of the buffer 32.

In such a configuration, the subtractor 4 generates a difference image between a macro block of the previous image stored in the frame memory 2 and a macro block of the estimated reconstructed image from the motion compensator 26 and outputs the difference image to the coder 34. In other words, the subtractor 4 outputs a difference image in which a redundancy between images adjacent to each other in the time base is eliminated. The coder 34 carries out the discrete cosine transform(DCT) processing for the difference image inputted from the subtractor 4 to code the difference image, thereby eliminating the space area co-relationship existing in the difference image. To this end, the coder 34 further includes a DCT circuit 6 for carrying out a DCT operation of the difference image in an 8×8 pixel unit, and a quantizer 8 for quantizing the DCT transformed signal. The VCL 30 is connected to the quantizer 8 to compress and output the coded difference image again in accordance with a value of code generation probability. The buffer 32 is connected to the VCL 30 to output a bit stream of the difference image in the first-in first-out system. The decoder 36 connected to the quantizer 8 reconstructs the coded difference image by carrying out an operation similar to the image reconstruction process performed at the coder. To this end, the decoder 36 includes an inverse quantizer 12 connected, in series, to the quantizer 8 to inverse-quantize the coded difference image, and an inverse discrete cosine transform(IDCT) circuit 14 for reconstructing the difference image by carrying out the IDCT operation. The adder 16 adds the difference image reconstructed at the IDCT circuit 14 to the estimated image from the motion compensator 26 and outputs the added image to the frame delay 18. Accordingly, the frame delay 18 stores a new reconstructed image for estimating an image to be inputted in the next order and allows it to be utilized to provide the motion prediction and compensation at the motion estimator 20.

FIG. 2 is a detailed block diagram showing the configuration of the first and second motion estimators 22 and 24 in the motion estimator 20 of FIG. 1. Each of the first and second motion estimators 22 and 24 simultaneously carry out a motion prediction operation with respect to five paths, i.e., frame, top-to-top, bottom-to-top, top-to-bottom and bottom-to-bottom paths. The first motion estimator 22 makes use of the input image and the previous image to perform a motion prediction in a single pixel unit with respect to the five paths. In this case, an image corresponding to a retrieval area is the previous image stored in the frame memory 2. The first motion estimator 22 makes use of a block matching algorithm for each five-path to predict a motion in the single pixel unit, thereby detecting a motion vector MV. The block matching algorithm refers to a process in which the most analogous block to a specified block of the input image is found from the previous image. The second motion estimator 24 predicts a motion in a half pixel unit on a basis of the single pixel unit of motion vector MV inputted from the first motion estimator 22. To this end, the second motion estimator 24 includes a half-pixel motion vector detector 21, first and second multiplexors 23 and 25, a second adder 27 and a field/frame determining circuit 29. In such a second motion estimator 24, the half-pixel motion estimator 21 detects a final motion vector by predicting a motion vector in a half pixel unit on a basis of each motion vector MV in a single pixel unit for the five paths inputted from the first motion estimator 22. In this case, the used retrieval area is a reconstructed image stored in the frame delay 18 in FIG. 1. The first multiplexor 23 selectively outputs a motion vector and a motion prediction error in the top-to-top path and a motion vector and a motion prediction error in the bottom-to-top path, which are detected at the half-pixel motion estimator 21, to the field/frame determining circuit 29 and the adder 27. The second multiplexor 22 selectively outputs a motion vector and a motion prediction error in the top-to-bottom path and a motion vector and a motion prediction error in the bottom-to-bottom path, which are detected at the half-pixel motion estimator 21, to the field/frame determining circuit 19 and the adder 27. Then, the adder 27 adds the motion detection errors between the fields outputted from the first and second multiplexors 23 and 25 and outputs the added motion detection error to the field/frame determining circuit 29. The field/frame determining circuit 29 compares a half-pixel motion detection error value in the frame path outputted from the half-pixel motion estimator 21 with a motion detection error value in the field path outputted from the adder 27 to thereby select a vector having the smaller motion detection error value, and outputs the selected vector value to the motion compensator 26 shown in FIG. 1.

FIGS. 3A and 3B depict a motion prediction method in a half-pixel unit employing a block matching algorithm. FIG. 3A shows an input image $I_t$, and FIG. 3B does the previous image $I_{t-1}$. In the input image $I_t$, the size $N_B$ of a specified block $B_t$ is 16. First, a local area for finding a block analogous to the specified block $B_t$ at the reference position (x,y) in the input image $I_t$ is determined from the previous image $I_{t-1}$. In this case, it is assumed that a local area determined from the previous image $I_{t-1}$ has a size of $x-S \sim x+S+N_B-2$ in the horizontal direction; while having a size of $y-S \sim y+S+N_B-2$ in the vertical direction, on a basis of the reference position (x,y). Herein, S represents a value for determining a size of the retrieval area. Next, the mean absolute difference(MAD) is used as a criterion for finding the most analogous block to the specified block $B_t$ of the input image $I_t$ at the local area of the previous image $I_{t-1}$. In other words, a MAD between a certain block $B_{t-1}$ and a specified block $B_t$ having a size of $N_B \times N_B$ is calculated at every certain position (u,v) in the local area of the previous image $I_{t-1}$. This MAD can be given from the following formula:

$$MAD(u, v) = \frac{1}{N_B \times N_B} \sum_{i=0}^{i=N_B-1} \sum_{j=0}^{j=N_B-1} |B_t(x+i, y+j) - B_{t-1}(x-u+i, y-v+j)| \qquad (1)$$

wherein $B_t(x+i,y+j)$ represents a (i,j)th pixel of the specified block $B_t$, a reference position of which is (x, y), in the input image $I_t$; and $B_{t-1}(x-u+i,y-v+j)$ represents a (i,j)th pixel of the block, a reference position of which is a position moved by (u,v) from (x, y), in the previous image $I_{t-1}$. Subsequently, a position $((u,v)^*)$ of a block $B_{t-1}$ having the smallest MAD in the previous image $I_{t-1}$ is detected. Herein, a displacement from a reference position (x,y) of the input image $I_t$ until a position $((u,v)^*)$ of the previous image $I_{t-1}$ is referred as to "a motion vector MV in a half pixel unit". Further, in order to obtain a motion vector MV in a single pixel unit from the formula (1) for calculating the MAD, it is necessary to provide an exponentially increasing calculation with respect to each field/frame path like the following formula:

Frame: $N_B \times N_B \times 2S \times 2S \times M$

Top-to-top, Bottom-to-top, Top-to-bottom and bottom-to-bottom fields:

$$4 \times N_B \times \frac{N_B}{2} \times 2S \times \frac{2S}{2} \times M \qquad (2)$$

wherein M represents a calculation amount required in a calculation of MDA per unit pixel. Also, if it is assumed that the picture size is W×H and the frame rate is 30 frame/second, then a calculation amount $OP_{SBMA}$ required every second for obtaining a motion vector in a single pixel unit can be expressed as the following formula:

$$OP_{FSBMA} = 30 \times \frac{W \times H}{N_B \times N_B} \times 2 \times N_B \times N_B 2S \times 2S \times M \qquad (3)$$

$$= 240 \times W \times H \times S \times S \times M.$$

FIG. 4 depicts the conventional method of predicting a motion in a half-pixel unit. Herein, the motion prediction in a half pixel unit refers to detecting the position of a block having the smallest error with respect to 9 half-pixels positioned at ±0.5 point on a basis of the motion vector MV in a single pixel unit detected at the first motion estimator 22. The position of the block having the smallest error can be detected by making use of the block matching algorithm in similarity to the above-mentioned motion prediction method in a single pixel unit. Each block corresponding to the 9 half-pixel position based on the motion vector in a single pixel unit can be calculated by the following formula:

Retrieval position 4, 5: $I(u\pm0.5, v) = \{I(u,v) + I(u\pm1,v)\}/2$

Retrieval position 2, 7: $I(u, v\pm0.5) = \{I(u,v) + I(u, v\pm1)\}/2$

Retrieval position 1, 3, 6, 8: $I(u\pm0.5, v\pm0.5) = \{I(u,v) \pm I(u, v\pm1) + I(u\pm1,v) + I(u\pm1,v\pm1)\}/4$ (4)

wherein (u,v) represent the co-ordinates for the motion vector in a single pixel unit.

Further, a calculation amount used when a motion in a half-pixel unit for each five path is predicted by applying the formula (4) can be seen from the following formula:

Frame : $N_B \times N_B \times 8 \times (M+L)$

Top-to-top, Bottom-to-top, Top-to-bottom and bottom-to-bottom fields:

$$N_B \times \frac{N_B}{2} \times 8 \times (M+L) \quad (5)$$

wherein L represents a calculation amount required for making one pixel at a half-pixel position. It is to be noted that the entire calculation amount required for a motion prediction in a half pixel unit is $3 \times N_B \times N_B \times 8 \times (M+L)$ as seen from the formula (5). In this case, if it is assumed that that the picture size is W×H and the frame rate is 30 frame/second, then a calculation amount $OP_{HPSBMA}$ required every second for obtaining a motion vector in a single pixel unit is given by the following formula:

$$OP_{HPSBMA} = 30 \times \frac{W \times H}{N_B \times N_B} \times 3 \times N_B \times N_B \times 8 \times (M+L) \quad (6)$$

$$= 720 \times W \times H \times (M+L)$$

Further, a ratio of a calculation amount $OP_{FSBMA}$ for obtaining a motion vector in a single pixel unit required every second to a calculation amount $OP_{HPSBMA}$ for obtaining a motion vector in a half pixel unit is given as follows:

$$\frac{OP_{FSBMA}}{OP_{HPSBMA}} = \frac{1}{3} \times S \times S \times \frac{M}{M+L}$$

It is to be understood from the equation that, as S increases, that is, as the retrieval area increases, a retrieval in a single pixel unit requires more and more large calculation amount than a retrieval in a half pixel unit.

As a result, when all positions within a motion prediction area is retrieved so as to provide a motion prediction in a single pixel unit, as a size of retrieval area increases, a tremendous calculation amount is required for the motion prediction in a single pixel unit. Accordingly, there has been developed various high speed retrieval algorithms to reduce a calculation amount for the motion prediction in a single pixel unit. A typical example of the high speed retrieval algorithms includes a hierarchical block matching algorithm.

FIGS. 5A to 5C illustrate an example of a hierarchical block matching algorithm consisting of three layers. A unit image is reconstructed into an image having a hierarchical structure for the hierarchical block matching algorithm. In FIGS. 11A to 11C, an image in a layer l+1 is an image obtained by filtering and sub-sampling an image in a layer l. The pixel number in the horizontal and vertical direction of an image in the layer l+1 is reduced to ½ compared with that of an image in the layer l. A motion prediction process in a single pixel unit employing such a hierarchical structure image will be explained below.

First, as shown in FIG. 5A, a motion prediction for an image in a smallest size of layer 2(l=2) are performed. Herein, it is to be noted that the size of an image in layer 2 is reduced to ¼ in the horizontal and vertical direction compared with that of the original image. The motion prediction method includes calculating and comparing block matching errors in an entire retrieval area MSA2 reduced to ¼ by utilizing a specified block $B_t$ reduced in size as described above.

Next, as shown in FIG. 5B, a motion prediction for an image in the layer 1(l=1) is performed. In this case, in order to improve an accuracy of a motion vector detected from an image in the layer 2, the block matching method is applied to only a local area MSA1 having a size added with ±2 pixels around a specified block $B_{t-1}$ based on the motion vector detected from the layer 2.

Subsequently, as shown in FIG. 5C, a motion prediction for an image in the layer 0(l=0) is performed. The motion prediction for an image in the layer 0 is carried out only for a local area MSA0 based on the motion vector detected from an image in the layer 1 in a similar manner to the motion prediction for an image in the layer 1.

Accordingly, a final motion vector detected by applying such a hierarchical block matching algorithm becomes a sum of motion vectors obtained from images in each layer.

FIG. 6 shows the configuration of a conventional motion prediction apparatus employing the above-mentioned hierarchical block matching algorithm. The motion prediction apparatus includes a first motion estimator 22 for predicting a motion in a single pixel unit by utilizing the hierarchical block matching algorithm, and a second motion estimator 24 for predicting a motion in a half pixel unit on a basis of a single-pixel motion vector inputted from the first motion estimator 22.

In the motion prediction apparatus shown in FIG. 6, the first motion estimator 22 carries out the motion prediction in a single pixel unit for three layers repeatedly by utilizing the above-mentioned hierarchical block matching algorithm, thereby detecting a final motion vector in a single pixel unit for five field/frame paths in an image of the lowermost layer 0. The second motion estimator 24 detects a motion vector in a half pixel unit on a basis of each final single-pixel motion vector for the five paths inputted from the first motion estimator 22.

FIG. 7 shows a detailed configuration of the single-pixel motion estimator and the half-pixel motion estimator for the layer 0 shown in FIG. 6. In FIG. 7, the single-pixel motion estimator 70 detects a final single-pixel motion vector $MV_0$ by retrieving a local area of the layer 0 on a basis of a motion vector $MV_1$ detected at the layer 1. To this end, the single-pixel motion estimator 70 for the layer 0 includes a first address generator 44 for receiving the motion vector $MV_1$ detected at the layer 1 to generate a reference position information $A_0$ for layer 0, a first buffer 46 connected to a data bus 54 to receive the previous image, a first internal memory 42 for storing an input image for the layer 0, a first arithmetic unit 40 connected commonly to the first buffer 46 and the first internal memory 42, and a first comparator 48 connected to the output terminal of the first arithmetic unit 40. The first address generator 44 receives a motion vector $MV_1$ detected at the layer 1 to generate a reference position information $A_0$ for the layer 0, and supplies it to an address bus 52. The first buffer 46 receives the previous image $S_0$ via the data bus 54 and stores it temporarily. The first arithmetic unit 40 retrieves the previous image $S_0$ inputted from the first buffer 46 on a basis of a specified block of the input image inputted from the first internal memory 42 to calculate a mean absolute difference(MAD) between the specified block of the input image and a certain block of the previous image $S_0$. The first comparator 48 compares MADs inputted from the first arithmetic unit 40 to detect and output a motion vector $MV_0$ for a position having the smallest MAD.

Meanwhile, the half-pixel motion estimator 80 retrieves a reconstructed image on a basis of the motion vector $MV_0$ inputted from the single-pixel motion estimator 70 in the layer 0 to detect a motion vector in a half pixel unit. To this end, the half-pixel motion estimator 80 includes a second address generator 50 connected to the first comparator 48 and the address bus 52, a second buffer 52 connected to the data bus to receive the reconstructed image, an interpolator 54 connected to the output terminal of the second buffer 52 a second internal memory 58 for storing the input image, a second arithmetic unit 56 connected commonly to the interpolator 54 and the second internal memory, and a second comparator 60 connected to the output terminal of the second arithmetic unit 56. The second address generator 50 generates a position information $A_h$ corresponding to a value of the motion vector $MV_0$ in a single pixel unit supplied form the first comparator 48. The second buffer 52 temporarily stores a reconstructed image $S_h$ supplied from the data bus 54. The interpolator 54 interpolates the reconstructed image supplied from the second buffer 52 and output the interpolated image to the second arithmetic unit 56. The second arithmetic unit 56 calculates a MAD in a half pixel unit by utilizing the reconstructed image $S_h$ inputted from the first buffer 46 and the input image stored in the second internal memory. The second comparator 60 compares MADs inputted from the second arithmetic unit to detect and output he motion vector $MV_h$ in a half pixel unit for a position having a smallest MAD.

If a motion prediction for five field/frame paths by employing such a hierarchical retrieval method as seen from an example of FIG. 6 and FIG. 7 is performed, then it has a disadvantage in that the required calculation can be reduced, but an accuracy of the motion prediction becomes deteriorated. This is caused by a fact that, when a retrieval for the entire retrieval area is performed at the uppermost layer having the lowest resolution so as to reduce the calculation amount, a probability in which an inaccurate initial motion vector may be detected becomes high and hence it is impossible to detect an accurate motion vector in the successive retrieval process employing the inaccurate initial motion vector. Accordingly, it is necessary to provide a novel motion prediction method which is capable of reducing the calculation amount during the motion vector detection in a single pixel unit as well as overcoming the problems in the existing method as mentioned above.

FIG. 8 is a view for explaining an input/output band width required at each step of the motion prediction method to which the hierarchical block matching algorithm is applied. In FIG. 8, the motion estimator 82 is commonly connected to four external memory EM2, EM1, EM0 and EMh over the data bus 54. In this case, the three external memory EM2, EM1 and EM0 stores input images in layer 2, layer 1 and layer 0, respectively, for the hierarchical retrieval. The remaining fourth external memory EMh stores a reconstructed image for the retrieval in a single pixel unit. Herein, if a requirement amount for an input/output band width of each step is calculated with reference to FIG. 5 and FIG. 6 assuming that the size of image is W×H and the frame rate is 30 frame/sec, then it can be expressed as the following formulas:

Input/output band width requirement amount for providing a retrieval area in a layer 2 $IO_{layer2}$:

$$IO_{layer2} = \left(\frac{2S}{4} + \frac{N_B}{4} - 1\right) \times \left(\frac{2S}{4} + \frac{N_B}{4} - 1\right) \times \frac{W \times H}{N_B \times N_B} \times 30$$

Input/output band width requirement amount for providing a retrieval area in a layer 1 $IO_{layer1}$:

$$IO_{layer1} = \left(4 + \frac{N_B}{2}\right) \times \left\{\left(4 + \frac{N_B}{2}\right) + 4 \times \left(4 + \frac{N_B}{4}\right)\right\} \times \frac{W \times H}{N_B \times N_B} \times 30$$

Input/output band width requirement amount for providing a retrieval area in a layer 0 $IO_{layer0}$:

$$IO_{layer0} = (4 + N_B) \times \left\{(4 + N_B) + 4 \times \left(4 + \frac{N_B}{2}\right)\right\} \times \frac{W \times H}{N_B \times N_B} \times 30$$

Input/output band width requirement amount for providing a retrieval area in a half pixel unit $IO_{half}$:

$$IO_{half} = (2 + N_B) \times \left\{(2 + N_B) + 4 \times \left(2 + \frac{N_B}{2}\right)\right\} \times \frac{W \times H}{N_B \times N_B} \times 30 \quad (7)$$

wherein a great part of the retrieval areas in layer 2 is overlapped due to the characteristic of hierarchical block matching algorithm, so that it becomes possible to reduce the input/output band width requirement amount dramatically by repeatedly utilizing the retrieval area data used once. Otherwise, since a retrieval area in the remaining layers is not overlapped, it is impossible to reduce the input/output band width requirement amount. For example, by applying values corresponding to a main profile at main level of MPEG-2(i.e., $N_B$=16, W=720, and H=480) to the formula (12), an input/output band width requirement amount for the remaining layers except for the layer 2 is given as follows:

$$IO_{layer1} = \left(4 + \frac{16}{2}\right) \times \left\{\left(4 + \frac{16}{2}\right) + 4 \times \left(4 + \frac{16}{4}\right)\right\} \times \frac{720 \times 480}{16 \times 16} \times 30$$

$$\approx 21.4 \text{ Mbyte/sec}$$

$$IO_{layer0} = (4 + 16) \times \left\{(4 + 16) + 4 \times \left(4 + \frac{16}{2}\right)\right\} \times \frac{720 \times 480}{16 \times 16} \times 30$$

$$\approx 55.1 \text{ Mbyte/sec}$$

$$IO_{half} = (2 + 16) \times \left\{(2 + 16) + 4 \times \left(2 + \frac{16}{2}\right)\right\} \times \frac{720 \times 480}{16 \times 16} \times 30$$

$$\approx 42.3 \text{ Mbyte/sec}$$

It is to be noted from the above equations that an input/output band width for a retrieval in the layer 0 and in a half pixel unit is relatively large. Particularly, a B picture process requiring a bi-directional motion prediction needs twice the input/output band width. Accordingly, a strategy for decreasing an excessive input/output band width required in the motion prediction process has been demanded. Also, a scheme for reducing a tremendous calculation amount required for the single-pixel motion prediction has been needed.

SUMMARY OF THE INVENTION

Accordingly, it is an object of the present invention to provide a motion prediction method and apparatus wherein, when the hierarchical block matching algorithm is employed, an input/output band width required for a motion prediction in a single pixel unit and a half pixel unit can be reduced.

Further object of the present invention is to provide a novel hierarchical motion prediction apparatus and method that is capable of reducing a calculation amount required in a single-pixel motion prediction.

In order to achieve these and other objects of the invention, a motion prediction apparatus according to one aspect of the present invention includes coding means connected to an input line for coding an input image; decoding means connected to the coding means for decoding the coded image signal; and motion estimating means connected commonly to the input line and the decoding means for retrieving a motion in a single unit repeatedly in accordance with a position information detected dependently at a plurality of layers with respect to the input image and for estimating a motion in a single pixel unit with respect to the decoded reconstructed image.

A motion prediction apparatus according to another aspect of the present invention includes coding means connected to an input line for coding an input image; decoding means connected to the coding means for decoding the coded image signal; and first motion estimating means connected commonly to the input line and the decoding means for retrieving a motion in a single unit repeatedly in accordance with a position information detected dependently at m layers with respect to the input image and for generating a second position information at the (m−1) numbered layer; second motion estimating means connected commonly to the decoding means and the first motion estimating means for estimating a motion in a single pixel unit with respect to the decoded reconstructed image at the m numbered layer in accordance with the second position information to generate a third position information, said m being an integer; and third motion estimating means connected commonly to the second motion estimating means and the decoding means for estimating a motion in a half pixel unit with respect to the reconstructed image in accordance with the third position information.

A motion prediction apparatus according to still another aspect of the present invention includes coding means connected to an input line for coding an input image; decoding means connected to the coding means for decoding the coded image signal; first motion estimating means connected commonly to the input line and the decoding means for retrieving a motion in a single unit repeatedly in accordance with a position information detected dependently at m layers with respect to the input image and for generating a second position information at the (m−1) numbered layer; and second motion estimating means connected commonly to the decoding means and the first motion estimating means for estimating a motion in a half pixel unit with respect to the decoded reconstructed image at a retrieval area including a retrieval region in a single pixel unit and a retrieval region in a half pixel unit in the m numbered layer in accordance with the second position information, said m being an integer.

A motion prediction method according to still another aspect of the present invention includes the steps of retrieving a motion in a single pixel unit repeatedly in accordance with a position information detected dependently at a plurality of layers with respect to an input image; coding and decoding the input image; and estimating a motion in a single pixel unit with respect to the decoded reconstructed image at a certain layer of the plurality of layers.

A motion prediction method according to still another aspect of the present invention includes the steps of retrieving a motion in a single pixel unit repeatedly in accordance with a position information detected dependently at m layers with respect to an input image to generate a position information at the (m−1) numbered layer; coding and decoding the input image; and retrieving a motion in a single pixel unit and a motion in a half pixel unit at the m numbered layer with respect to the decoded reconstructed image in accordance with the position information, said m being an integer.

A motion prediction method according to still another aspect of the present invention includes the steps of retrieving a motion in a single pixel unit repeatedly in accordance with a position information detected dependently at m layers with respect to an input image to generate a first position information at the (m−1) numbered layer; coding and decoding the input image; and estimating a motion in a half pixel unit at a retrieval area including a retrieval region in a single pixel unit and a retrieval region in a half pixel unit in the m numbered layer in accordance with the first position information.

According to still another aspect of the present invention, a motion prediction method of performing a motion prediction by dividing a hierarchical structure in coding an input image, includes the steps of detecting an initial motion vector in a single pixel unit with respect to a block having a size larger than a reference block at a layer having the smallest retrieval area; estimating a motion in a single pixel unit with a predetermined size of local area around the initial motion vector at the next low-order layer and then estimating a motion in a single pixel unit repeatedly for each layer in the similar manner, to thereby detect a final single-pixel motion vector at the lowermost layer; and retrieving a decoded image around the single pixel motion vector detected in the detecting process to thereby estimate a motion in a half pixel unit.

According to still another aspect of the present invention, a motion prediction method of performing a motion prediction by dividing a hierarchical structure in coding an input image, includes the steps of (A) detecting n initial motion vectors in a single pixel unit with respect to a block having a size larger than a reference block at a layer having the smallest retrieval area; (B) selecting m numbers(wherein m is less than n) in a sequence of a position having a smaller average absolute error in retrieval positions generated by the n times local retrieval at the next low-order layer and repeating the selection for each layer in the similar manner, to thereby finally detect one single-pixel motion vector; and (C) estimating a motion in a half pixel unit by retrieving a decoded image around the single-pixel motion vector detected in the step (B).

BRIEF DESCRIPTION OF THE DRAWINGS

These and other objects of the invention will be apparent from the following detailed description of the embodiments of the present invention with reference to the accompanying drawings, in which:

FIGS. 14A to 14D depict a motion prediction method according to a third embodiment of the present invention step by step;

FIG. 16 is a block diagram showing the configuration of a motion prediction apparatus to which the motion prediction method according to the third embodiment of the present invention is applied; and FIGS. 17A to 17D depict a motion prediction method according to a fourth embodiment of the present invention step by step.

DETAILED DESCRIPTION OF THE PREFERRED EMBODIMENT

Figure 1:
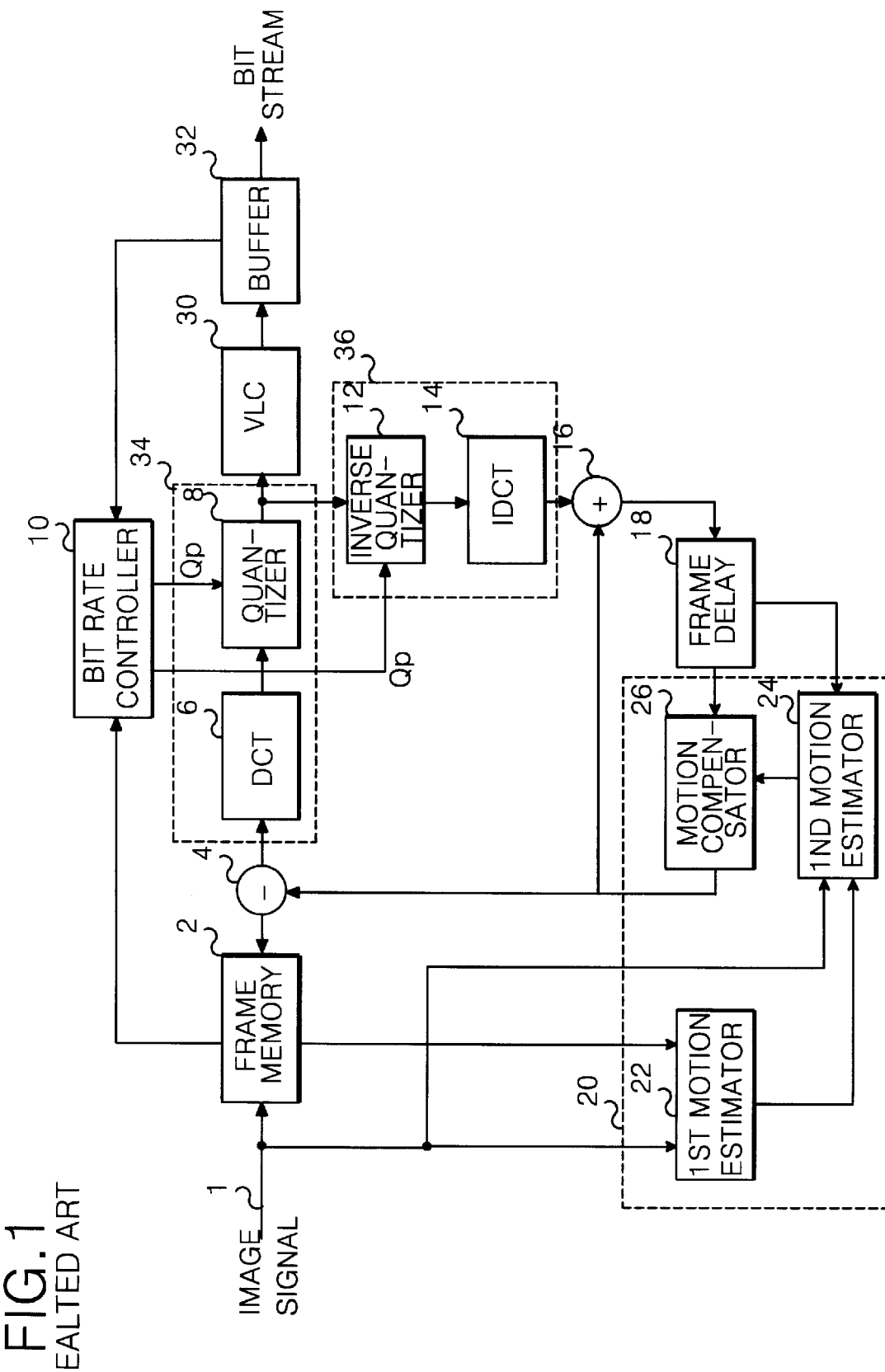
FIG. 1 is a block diagram showing the configuration of a conventional MPEG-2 system coder.
Figure 2:
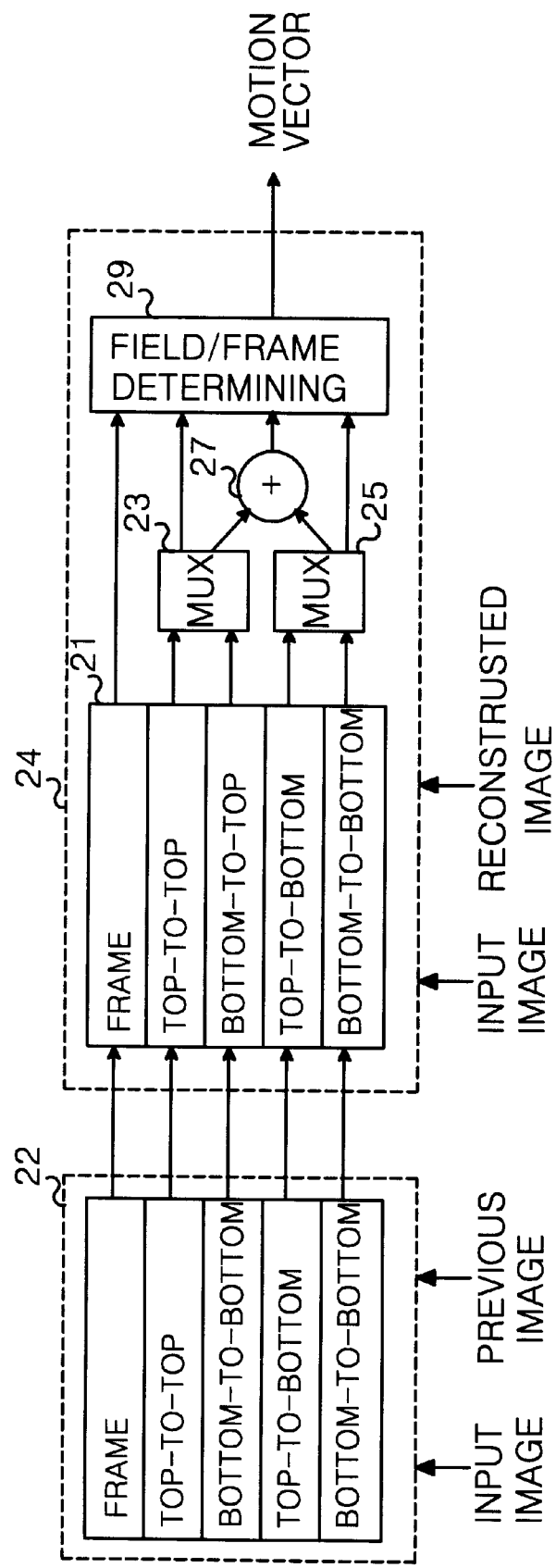
FIG. 2 is a detailed block diagram of the first and second motion estimator shown in FIG. 1.
Figure 3B:
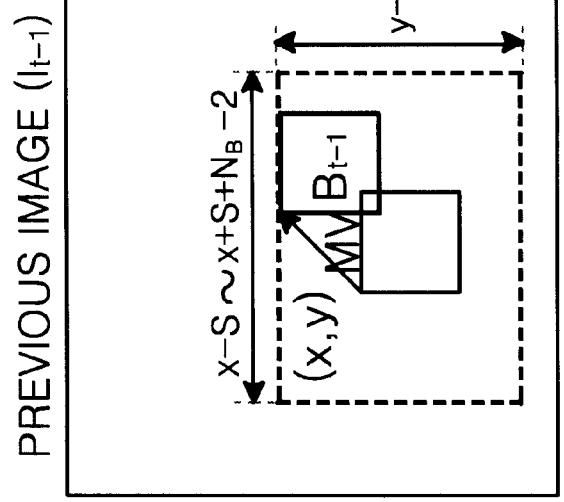
FIGS. 3A to 3B depict a conventional block matching algorithm for the entire area.
Figure 3A:
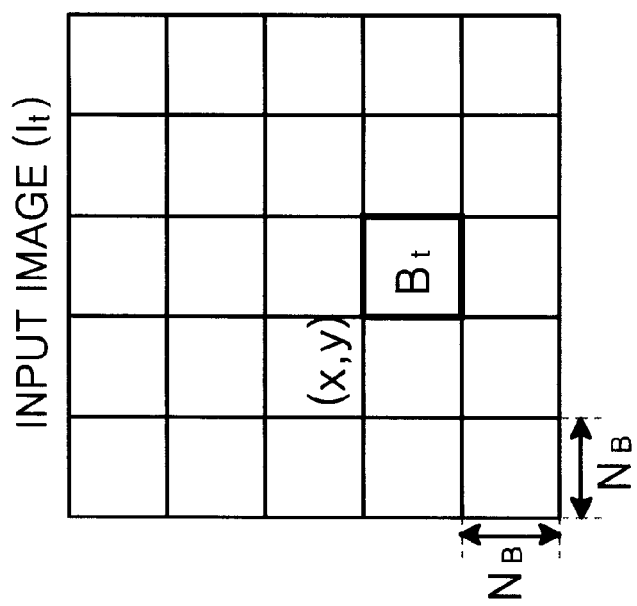
Figure 4:
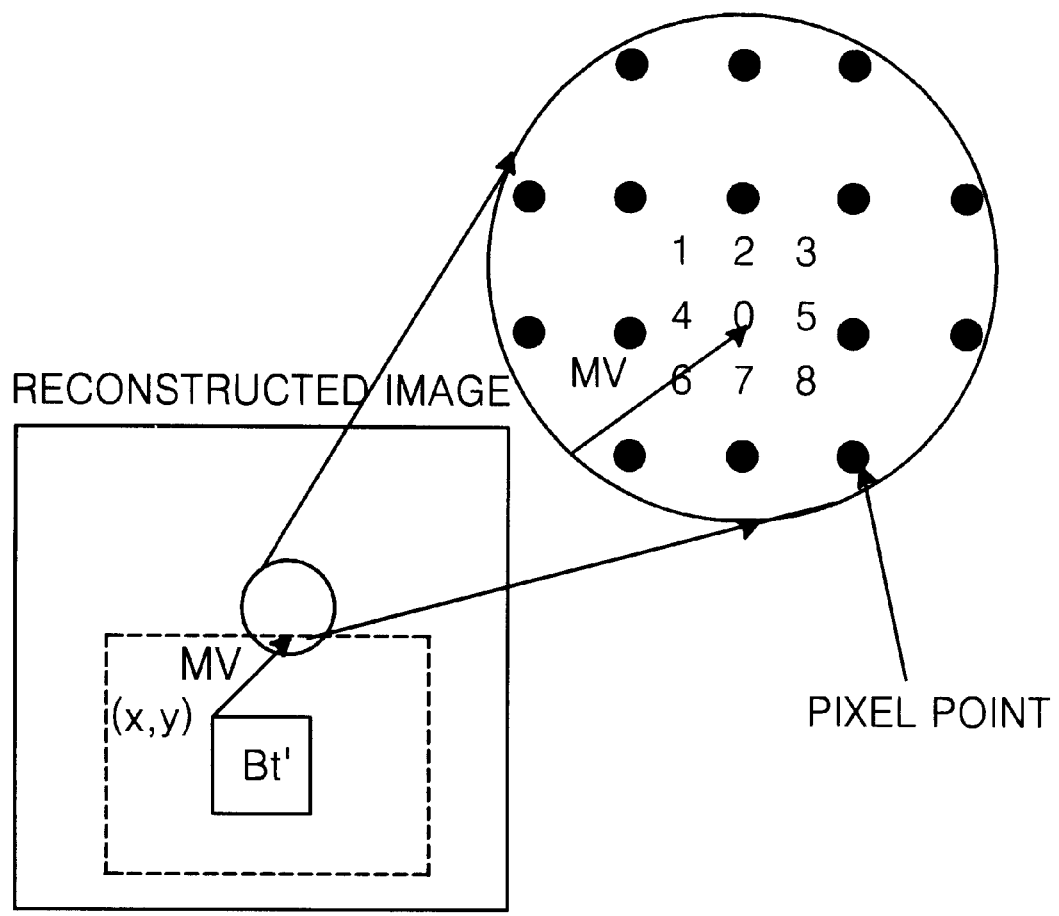
FIG. 4 shows a conventional motion prediction method in a half pixel unit.
Figure 5A:
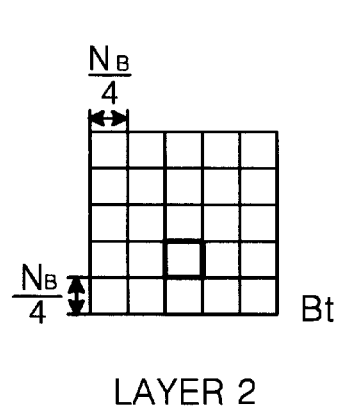
FIGS. 5A to 5C depict a conventional hierarchical block matching algorithm.
Figure 5A:
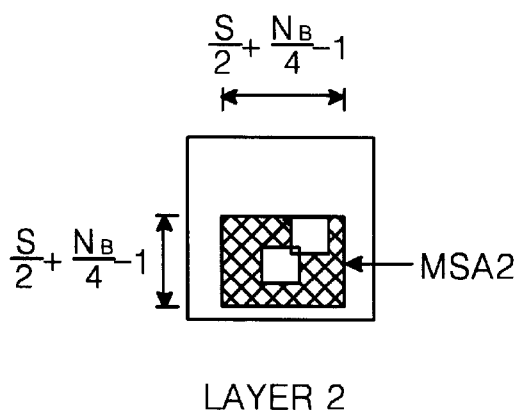
Figure 5B:
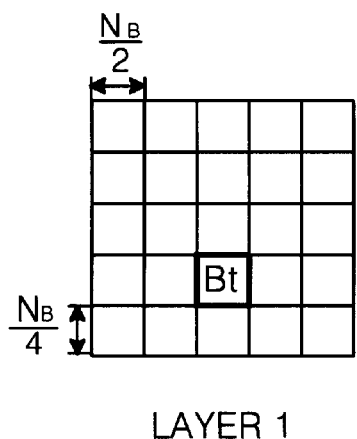
Figure 5B:
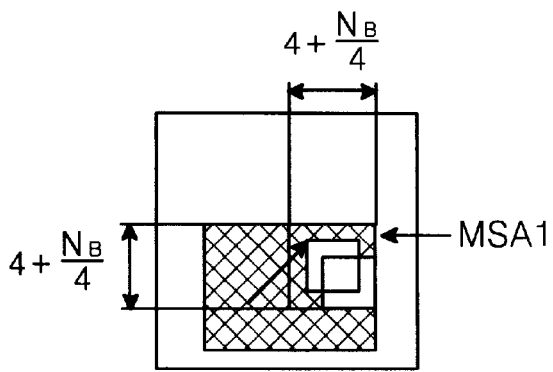
Figure 5C:
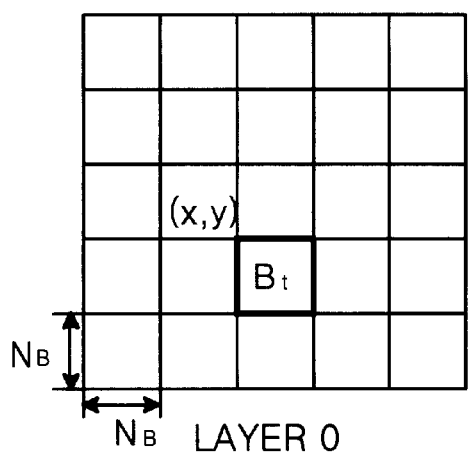
Figure 5C:
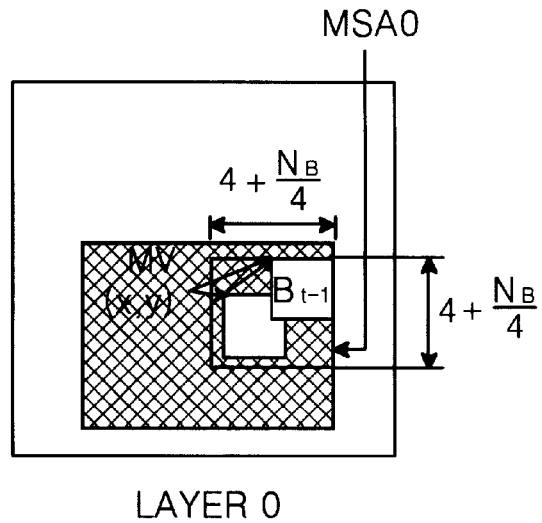
Figure 6:
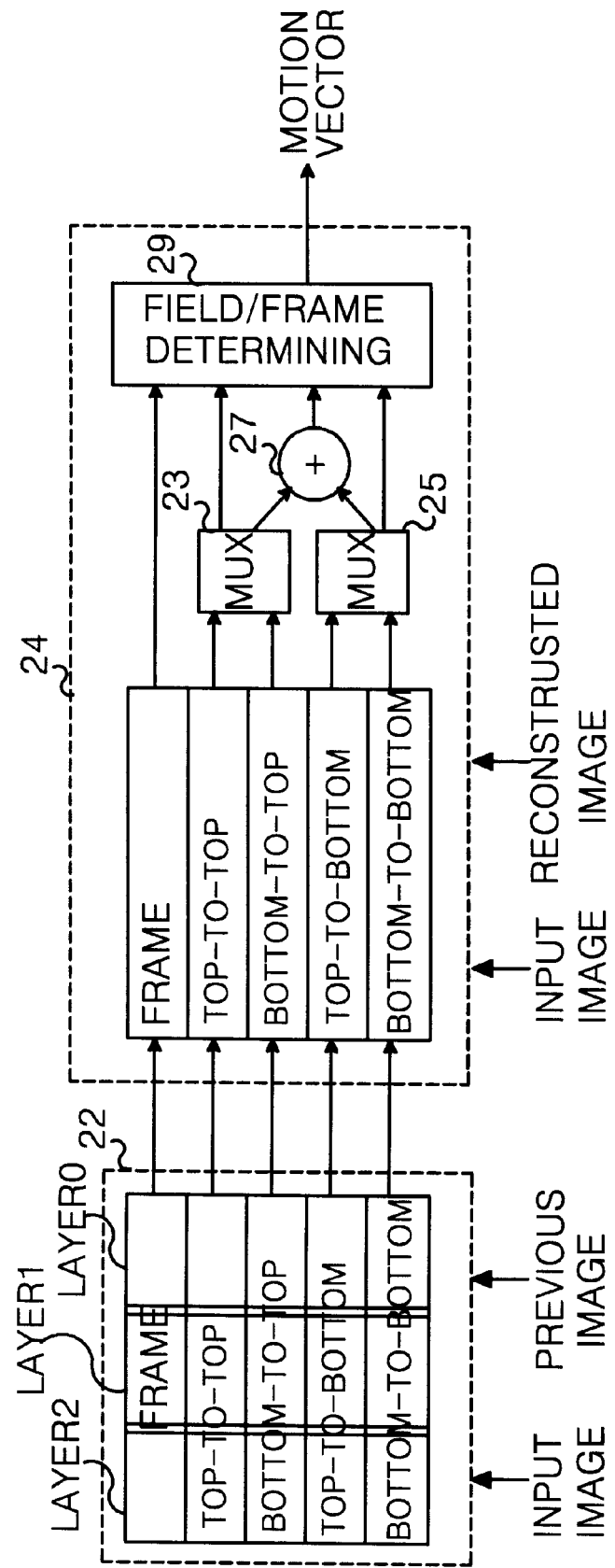
FIG. 6 is a block diagram showing the configuration of a motion prediction apparatus employing the conventional hierarchical block matching algorithm.
Figure 7:
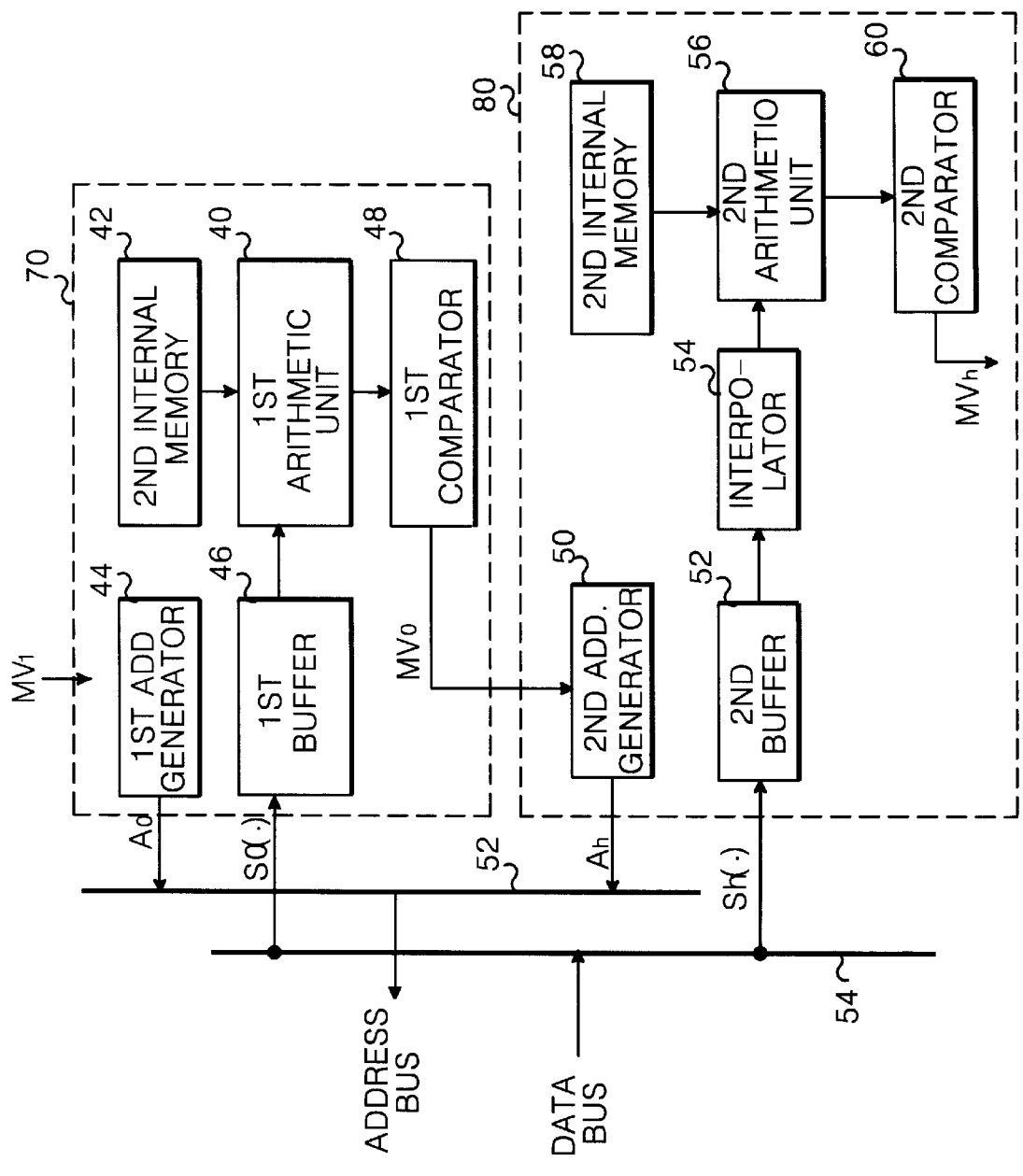
FIG. 7 is a detailed block diagram of the single-pixel motion estimator and the half-pixel motion estimator for layer 0 shown in FIG. 6.
Figure 8:
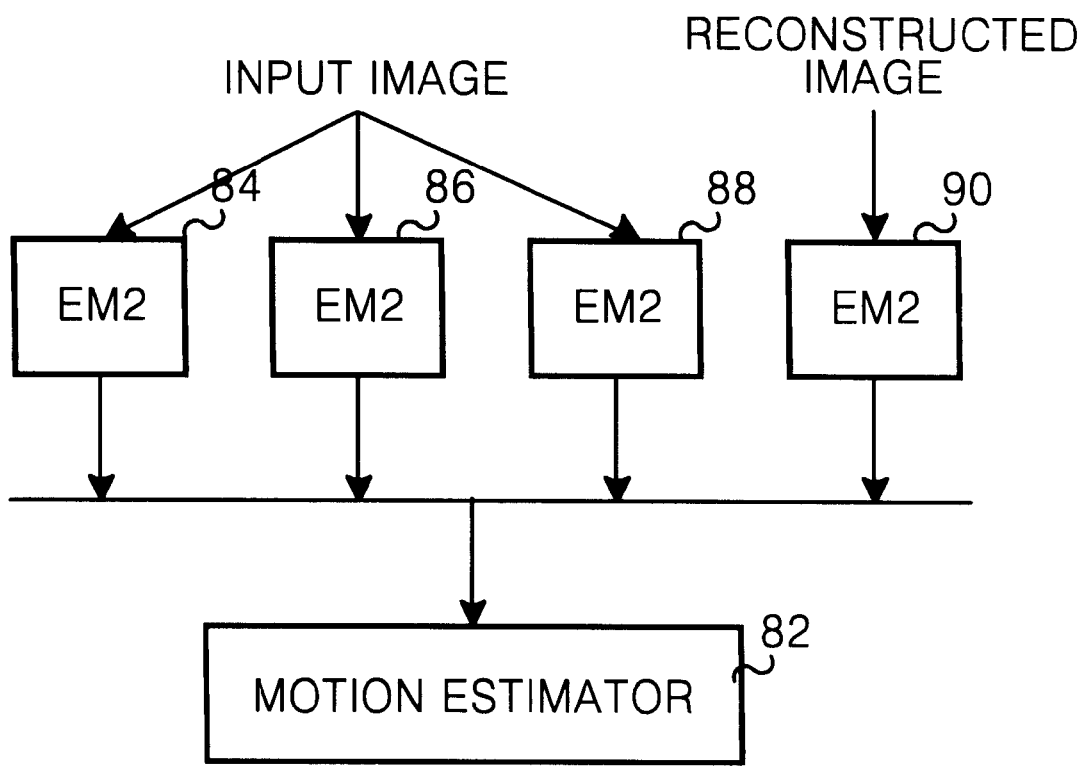
FIG. 8 is a view for explaining an input/output band width required in each step of the motion prediction method employing the hierarchical block matching algorithm.
Figure 9:
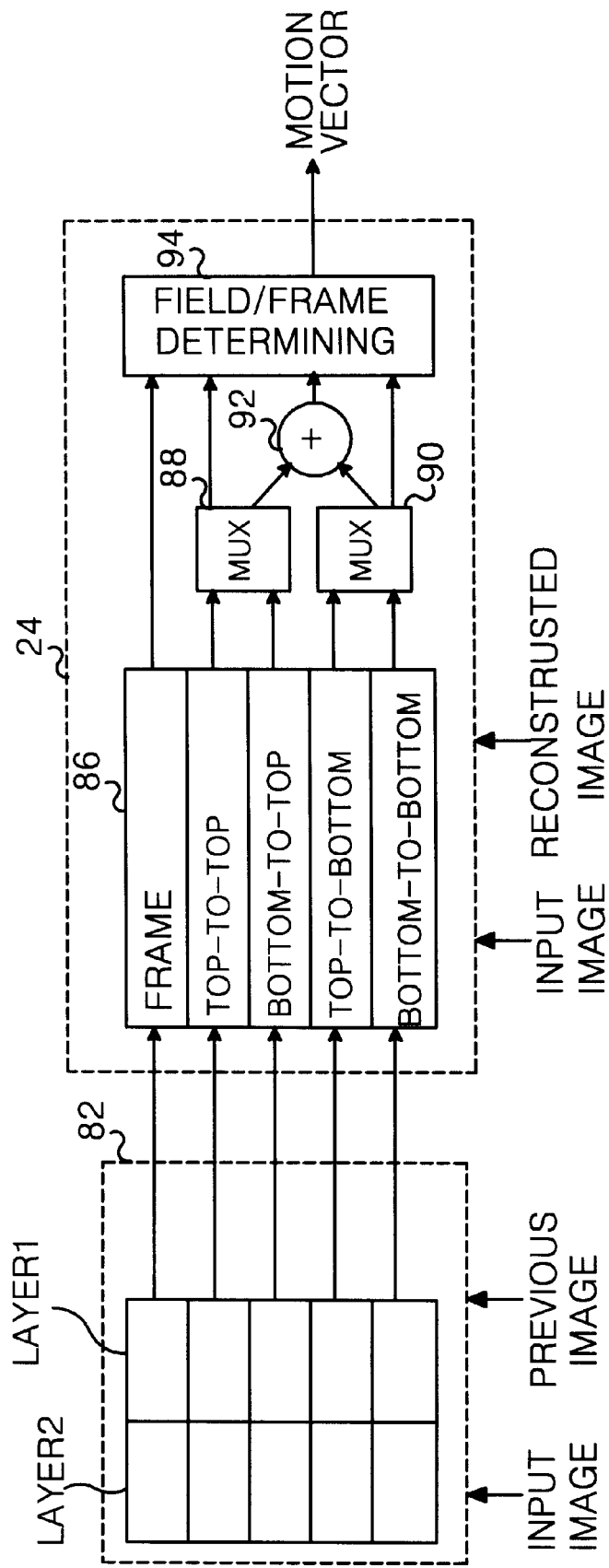
FIG. 9 is a block diagram showing the configuration of a motion prediction apparatus according to a first embodiment of the present invention.

Referring to FIG. 9, there is shown a motion prediction apparatus according to an embodiment of the present invention. The motion prediction apparatus includes a first motion estimator 82 for inputting an input image and the previous image to predict a motion in a single pixel unit by means of the hierarchical retrieval, and a second motion estimator 84 for inputting a reconstructed image to compatibly carry out a retrieval in a single pixel unit and a retrieval in a half pixel unit for the lowermost layer on a basis of a single-pixel motion vector inputted from the first motion estimator 22.

The first motion estimator 82 receives the input image and the previous image to perform a motion prediction for each of five field/frame paths hierarchically. For example, the first motion estimator 82 carries out the motion prediction in a single pixel unit for the layer 2 and the layer 1 hierarchically to detect a motion vector in a single pixel unit. The second estimator includes a motion vector detector 86, first and second multiplexors 88 and 90, an adder 92 and a field/frame determining circuit 94. The motion vector detector 86 carries out the motion prediction in a single pixel unit and the motion prediction in a half pixel unit for the layer 0 on a basis of the motion vector inputted from the first motion estimator 82 to detect a final motion vector. The first multiplexor 88 supplies a motion vector and a motion prediction error in a top-to-top field path and a motion vector and a motion prediction error in a bottom-to-top field path inputted from the motion vector detector 86 to the field/frame determining circuit 94 and the adder 92 selectively. Meanwhile, the second multiplexor 90 supplies a motion vector and a motion prediction error in a top-to-bottom field path and a motion vector and a motion prediction error in a bottom-to-bottom field path inputted from the motion vector detector 86 to the field/frame determining circuit 94 and the adder 92 selectively. The adder 92 adds the motion detection errors for the field paths applied from the first and second multiplexors 88 and 90 and outputs the added motion detection error to the field/frame determining circuit 94. The field/frame determining circuit 94 compares the motion detection error in the frame path supplied from the motion vector detector 86 with the motion detection error in the field path outputted from the adder 92 to thereby select and output the vector having the smaller motion detection error value.

Figure 10:
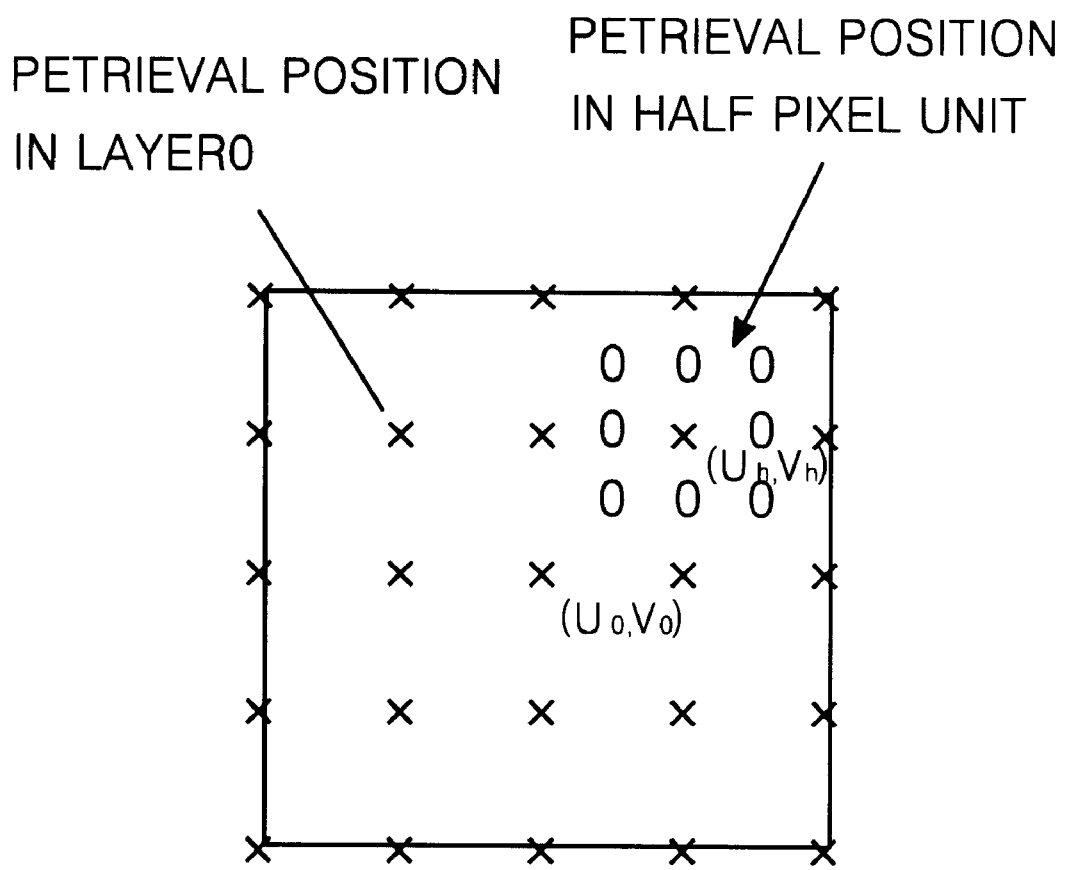
FIG. 10 represents a retrieval position in layer 0 and in a half pixel unit applied to the motion prediction method according to the first embodiment of the present invention.

FIG. 10 represents retrieval positions for a retrieval in the layer 0 and a retrieval in a half pixel unit using the motion vector detector 86 shown in FIG. 9. In FIG. 10, it is to be understood that, in the case of a retrieval in the layer 0, the motion vector detector 86 retrieves an area extending into ±2 position in the horizontal and vertical direction around a reference position $(U_0, V_0)$ obtained by the hierarchical retrieval for the layers 2 and 1, so that total 25 retrieval points exist in an image of the layer 0. On the other hand, in the case of a retrieval in the half pixel unit, the motion vector detector 86 retrieves an area extending into ±0.5 position in the horizontal and vertical direction around a reference position $(U_h, V_h)$ obtained by the hierarchical retrieval for the layer 0, so that total 9 retrieval points exist. Herein, the first method for reducing an input/output band width is to use only a reconstructed image as a retrieval area data corresponding to each retrieval point with keeping the retrieval step for the layer 0 and the retrieval step for the half pixel unit as they are, as shown in FIG. 10. In this case, since the retrieval in a half pixel unit is performed after a retrieval for the layer 0 is completed, an additional internal memory is required to store a retrieval area data for the layer 0.

Figure 11:
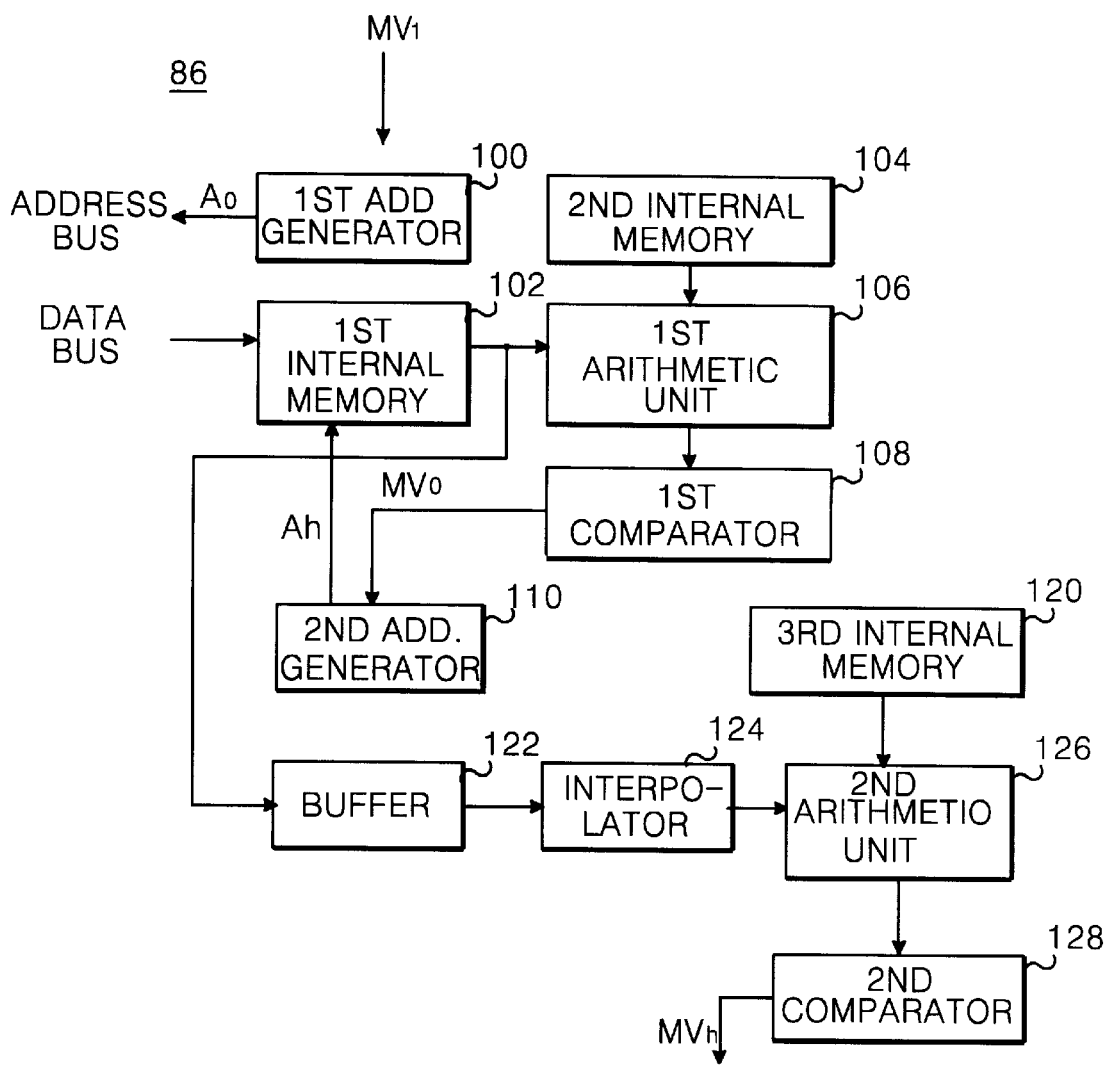
FIG. 11 is a detailed block diagram of the motion vector detector shown in FIG. 9.

FIG. 11 is a detailed block diagram of the motion vector detector 86 shown in FIG. 9 according to an embodiment of the present invention. In FIG. 11, the motion vector detector 86 includes a first address generator 100 for receiving a motion vector $MV_1$ from the first motion estimator 82 shown in FIG. 9 to generate a reference position information, a first internal memory 102 connected to a data bus, a second internal memory 104 for storing an input image, a first arithmetic unit 106 connected commonly to the first and second internal memories 102 and 104, and a first comparator 108 connected to the output terminal of the first arithmetic unit.

The first address generator 100 receives a motion vector $MV_1$ in a single pixel unit detected at the layer 1 by means of the first motion estimator 82 to generate a reference position information and output the same to the address bus. The first internal memory 102 stores a reconstructed image in the layer 0 supplied via the data bus. The second internal memory 104 stores an input image in the layer 0. The first arithmetic unit 106 receives a reconstructed image in the layer 0 supplied from the first internal memory 102 and an input image in the layer 0 supplied from the second internal memory 104 to detect MADs and output them to the first comparator 108. The first comparator compares MADs supplied from the first arithmetic unit 106 to thereby detect a motion vector $MV_0$ for a position having the smallest MAD.

The motion vector detector 86 in FIG. 9 further includes a second address generator 110 connected to the first comparator 108 and the first internal memory 102, a buffer connected to the output terminal of the first internal memory 102, a interpolator 124 connected to the output terminal, a third internal memory 120 for storing an input image, a second arithmetic unit 126 connected commonly to the interpolator 124 and the third internal memory 120, and a second comparator 128 connected to the output terminal of the second arithmetic unit 126.

In FIG. 11, the second address generator 110 generates a position information $A_h$ corresponding to the motion vector $MV_0$ supplied from the first comparator 108 and outputs it to the first internal memory 102. The first internal memory 102 extracts an image data corresponding to a retrieval area in a half pixel unit on a basis of the position information $A_h$ supplied from the second address generator 110 from the reconstructed area in the layer 0, and outputs the extracted image data to the buffer 122. The buffer 122 temporarily stores an image data at the retrieval area supplied from the first internal memory 102. The interpolator 124 interpolates an image data at the retrieval area supplied from the buffer 122 and supplies it to the second arithmetic unit 126. The second arithmetic unit 126 retrieves the retrieval area supplied from the interpolator 124 on a basis of a reference position of the input image supplied from the third internal memory 120 to detect MADs in a half pixel unit. The second comparator 128 compares MADs supplied from the second arithmetic unit 126 to thereby detect a motion vector $MV_h$ for a position having the smallest MADs.

Figure 12A:
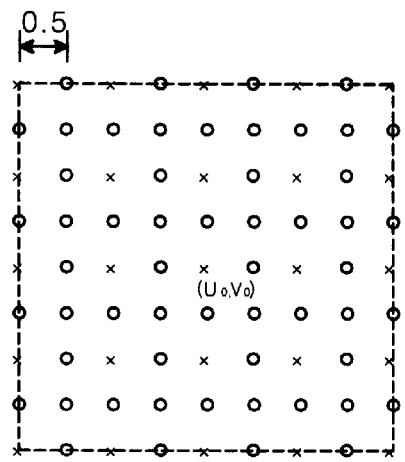
FIG. 12 represents a retrieval position in layer 0 and in a half pixel unit applied to the motion prediction method according to a second embodiment of the present invention.
Figure 12B:
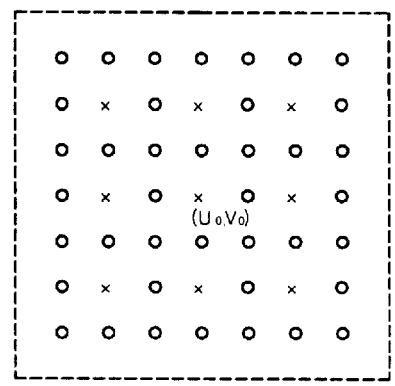
Figure 12C:
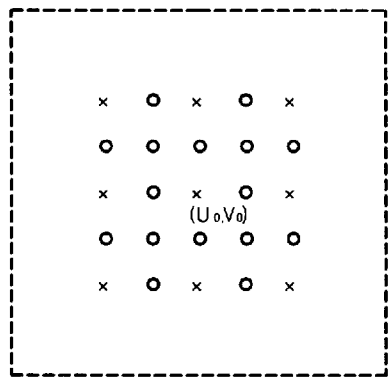
Figure 12D:
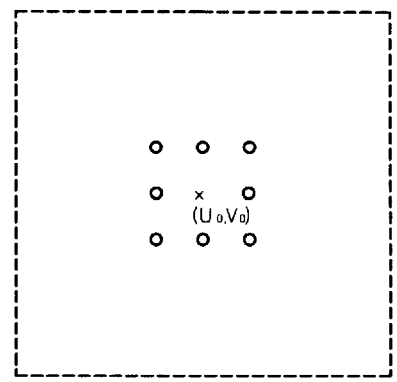

FIGS. 12A to 12D represent a range of a retrieval in the layer 0 and in a half pixel unit applied to a motion prediction method according to a second embodiment of the present invention. In FIG. 12A, the motion prediction method according to the second embodiment of the present invention is to perform a retrieval in a half pixel unit over the entire area including a retrieval range in the layer 0 and a retrieval range in the half pixel unit. This method has an advantage in that it does not require a separate internal memory. In this method, however, total 81 retrieval points exist for a retrieval in a half pixel unit over an area of ±2 in the vertical and horizontal direction. In other words, this method results in an increase in the calculation amount compared with the method according to the first embodiment. However, this method is capable of reducing the number of retrieval points when the motion prediction performance and the calculation amount are appropriately selected. For example, FIGS. 12B, 12C and 12D represent the case where the number of retrieval points is limited into 49, 25 and 9, respectively.

Figure 13:
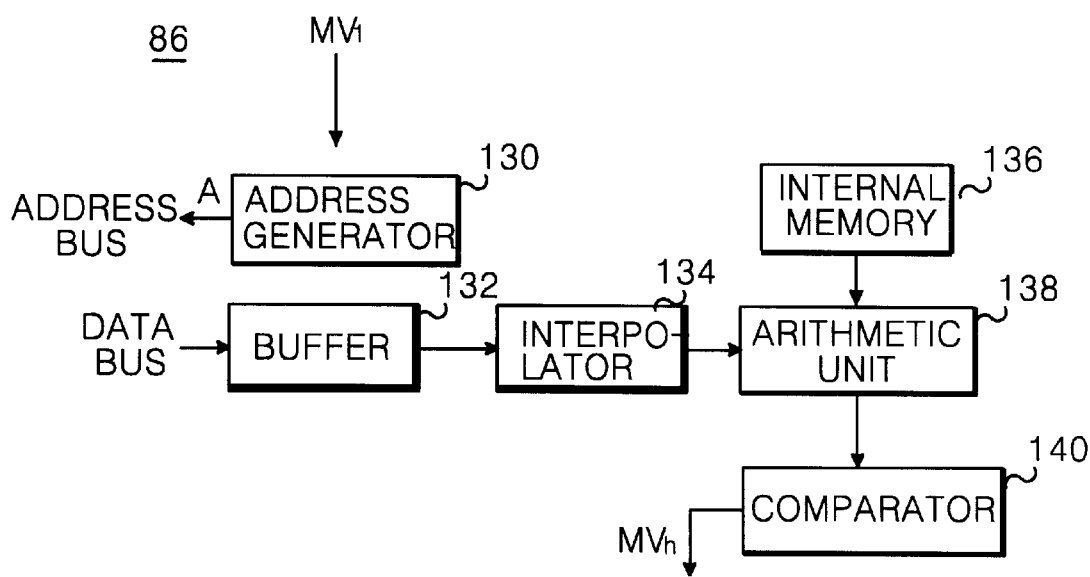
FIG. 13 is a detailed block diagram of the motion vector detector included in a motion prediction apparatus according to the second embodiment of the present invention.

FIG. 13 is a detailed block diagram showing another embodiment of a motion vector detector 86 to which the motion prediction method according to the second embodiment of the present invention is applied. The motion vector detector 86 includes an address generator 130 for receiving a motion vector $MV_1$ detected at the first motion estimator 82 to generate a reference position information A, a buffer 132 connected to a data bus, an interpolator 134 connected to the output terminal of the buffer 132, an internal memory 136 for storing an input image, an arithmetic unit connected commonly to the interpolator 134 and the internal memory 136, and a comparator 140 connected to the output terminal of the arithmetic unit 136.

The address generator 130 generates a reference position information A corresponding to the motion vector $MV_1$ in the layer 1 supplied from the first motion estimator 82 shown in FIG. 9 and output it to an address bus. The buffer 132 temporarily stores a reconstructed image in the layer 0 supplied via the data bus. The interpolator 134 interpolates a reconstructed image supplied from the buffer 132 and outputs it to the arithmetic unit 138. The internal memory 136 stores an input image in the layer 0. The arithmetic unit 138 retrieves a reconstructed image supplied from the interpolator 134 in a half pixel unit on a basis of a reference position of the input image stored in the internal memory 136, thereby detecting a MAD. The comparator 140 compares MADs supplied from the arithmetic unit 138 to thereby detect a motion vector $MV_h$ for a position having the smallest MAD.

FIGS. 14A to 14D depict a motion prediction method according to the third embodiment of the present invention step by step. This motion prediction method utilizes a hierarchical block matching algorithm consisting of four steps so as to reduce a calculation amount required for the motion prediction in a single pixel unit while maintaining an accuracy of the motion prediction. In FIGS. 14A to 14D, the image of hierarchical structure is constructed by filtering and sub-sampling the unit image successively. Herein, an image in layer l+1 is an image in which the number of pixels in the horizontal and vertical direction is reduced to ½ compared with an image in layer l. Accordingly, the size of a reference block for each layer image is set to 16×16, 8×8, 4×4 and 2×2. A motion prediction process in a single pixel unit employing such an image having the hierarchical structure will be described below.

Figure 14A:
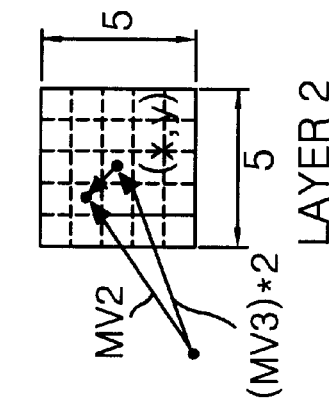
Figure 14A:
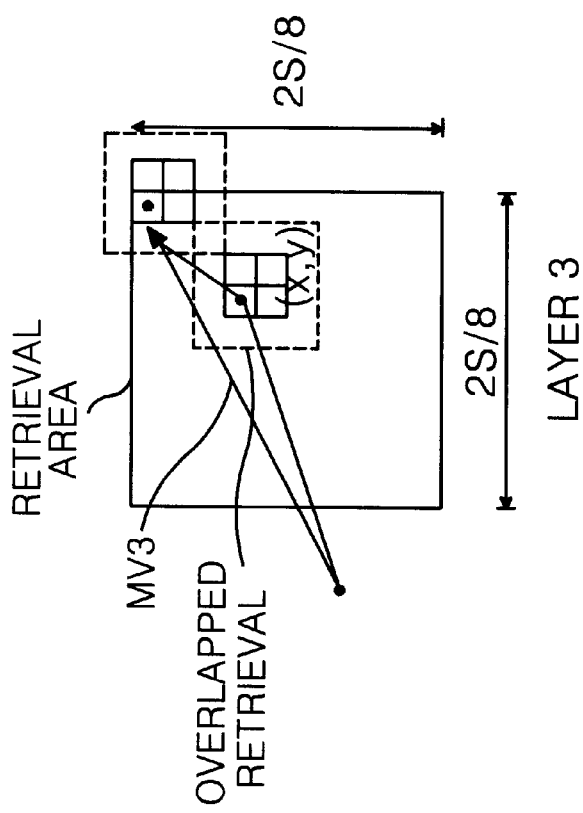
Figure 15:
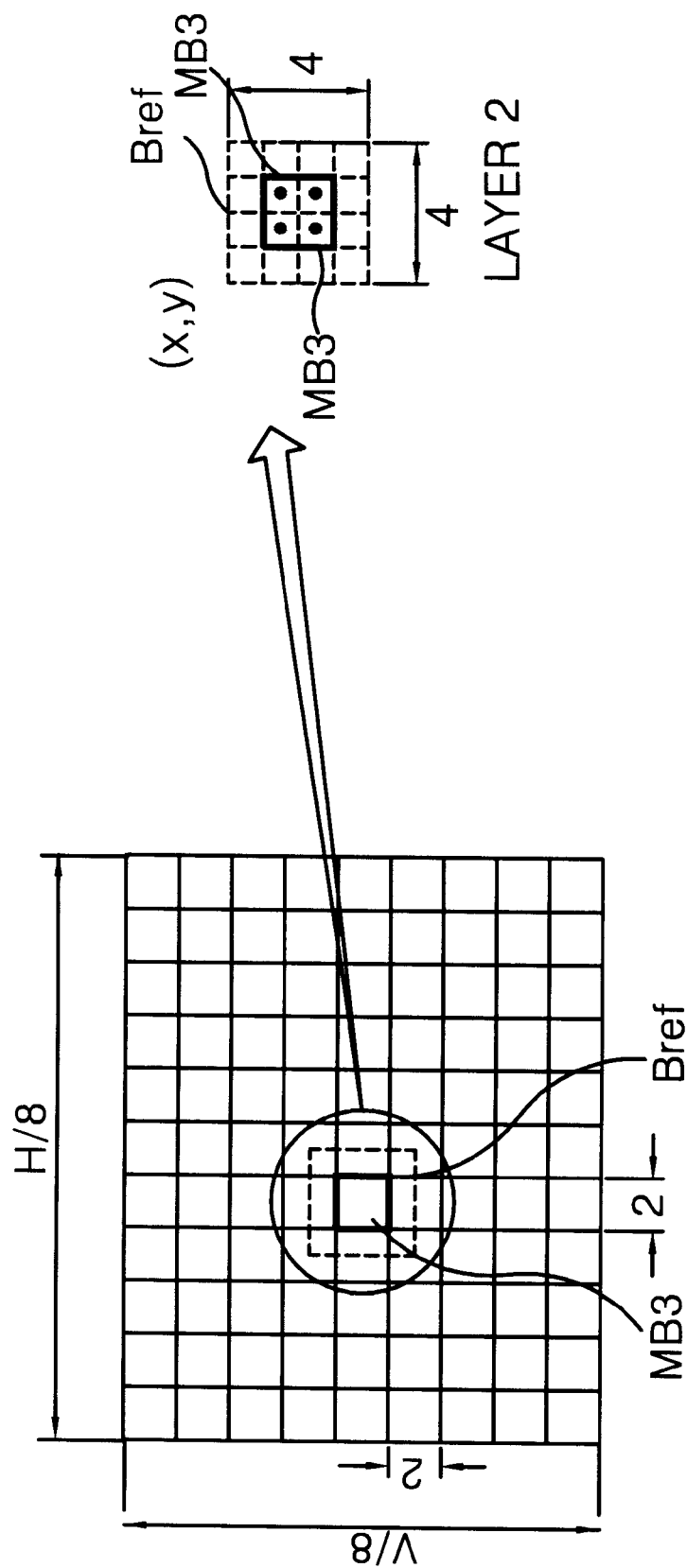
FIG. 15 is an enlarged view of the reference block utilized for the motion prediction in the layer 3 shown in FIG. 14A.

First, as shown in FIG. 14A, a motion prediction for an image in layer 3 set to the smallest size of retrieval area is performed. Herein, it is to be noted that the size of an image in layer 3(l=3) is reduced to ⅛ compared with that of the original image. The motion prediction method includes calculating and comparing a block matching error on a basis of the reference block reduced to ⅛ at the entire retrieval area reduced to ⅛. The characteristic of such a motion prediction for the layer 3 is to detect a motion vector MV3 with respect to a block(i.e., 4×4 pixels) greater than the reference block(i.e., 2×2 pixels). In other words, the 4×4 pixel block is set as a reference block Bref employed for the motion prediction in the layer 3 in such a manner to overlap with 8 macro blocks MB(i.e., 2×2 pixels) adjacent as shown in FIG. 15. Further, an initial motion vector MV3 for the reference block Bref of 4×4 pixels is detected such that a spatial continuity of the motion vector can be assured in a block unit. Generally, since an object in a picture at a video image has a spatially continuous motion, it becomes possible to detect the initial motion vector MV3 which is more approximate to its real motion when the 4×4 blocks Bref are used. Accordingly, considering that a calculation amount of the block matching algorithm is proportional to a product of a square of the unit block size by a square of the retrieval area size, it is to be noted that, a size of retrieval area at the layer 3 is reduced to ⅛ and a size of unit block at the layer 3 is reduced to ¼, so that the total calculation amount can be reduced to $(⅛)^2 × (¼)^2$. In other words, a calculation amount required for the motion prediction at the layer 3 can be expressed as the following formula:

$$C_{layer3} = \left(2 \times \frac{N_B}{8}\right)^2 \times \left(\frac{2S}{8}\right)^2 \times M \qquad (8)$$

Figure 14B:
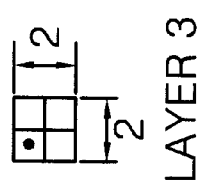
Figure 14B:
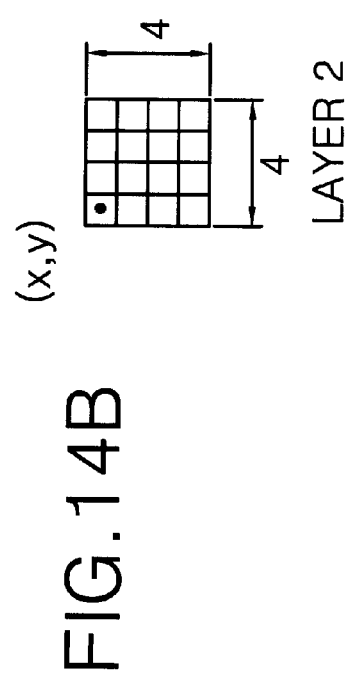

Next, a motion prediction for an image in layer 2(l=2) as shown in FIG. 14B is performed. The motion prediction at the layer 2 is to detect a motion vector MV2 in the layer 2 by applying the block matching method to a local area around the initial motion vector MV3 so as to improve an accuracy of the initial motion vector MV3 detected at the layer 3. In this case, a local area size at an image in the layer is usually set to about ±2. Such a local area size is negligibly small compared with the size of entire retrieval area, so that an accuracy of the motion vector at the layer 2 can be improved without a large increase of the calculation amount. A calculation amount required for the motion prediction at the layer 2 can be expressed as the following formula:

$$C_{layer2} = \left(\frac{N_B}{4}\right)^2 \times 5^2 \times M \qquad (9)$$

Subsequently, as shown in FIG. 14C, a motion prediction for an image in layer 1(l=1) is performed. The motion prediction at the layer 1 is to detect a motion vector MV1 in the layer 1 by applying the block matching method to a local area(±2 range) around the motion vector MV2 detected at the layer 2 in a similar manner to the motion prediction at the layer 2. In this case, a calculation amount required for the motion prediction at the layer 1 can be expressed as the following formula:

$$C_{layer1} = \left(\frac{N_B}{2}\right)^2 \times 5^2 \times M \qquad (10)$$

Finally, as shown in FIG. 14D, a motion prediction for an image in layer 0(l=0) is performed. The motion prediction at the layer 0 is to detect a motion vector MV0 in the layer 1 by applying the block matching method to a local area(±2 range) around the motion vector MV1 detected at the layer 1 in a similar manner to the motion prediction at the layer 1. In this case, a calculation amount required for the motion prediction at the layer 0 can be expressed as the following formula:

$$C_{layer0} = N_B^2 \times 5^2 \times M \qquad (11)$$

As a result, the motion vectors MV1 detected at each of the layer 0, 1 and 2 are detected from the motion vector $(MV_{l+1})$ in the high-order layer in such a manner to have a relationship as expressed in the following formula:

$$MV_l = 2 \times MV_{l+1} + \Delta MV_l, \quad l=0,1,2 \qquad (12)$$

wherein $\Delta MV_l$ is a local motion vector.

Referring now to FIG. 16, there is shown a motion prediction apparatus according to a third embodiment of the present invention. The motion prediction apparatus includes a first motion estimator 150 for inputting an input image and the previous image to carry out a motion prediction in a single pixel unit by four step, and a second motion estimator 160 for carrying out a motion prediction in a half pixel unit on a basis of a motion vector in a single pixel unit supplied from the first motion estimator 150.

The first motion estimator 150 receives the input image and the previous image to carry out the motion prediction in a single pixel unit by the four step by utilizing the above-mentioned hierarchical block matching algorithm, thereby detecting a motion vector in a single pixel unit. The second motion estimator 160 includes a motion vector detector 162 for detecting a motion vector in a half pixel unit, first and second multiplexors 164 and 166, an adder 168, and a field/frame determining circuit 170. In the second motion estimator 160, the motion vector detector 162 retrieves a reconstructed image on a basis of a motion vector detected at the lowermost layer(i.e., layer 0) of the first motion estimator 150 to perform a motion prediction operation in a half pixel unit. The first multiplexor 164 selectively output a motion vector and a motion prediction error in a top-to-top field path and a motion vector and a motion prediction error in a bottom-to-top field path supplied from the motion vector detector 162 to the field/frame determining circuit 170 and the adder 168. On the other hand, the second multiplexor 166 selectively output a motion vector and a motion prediction error in a top-to-bottom field path and a motion vector and a motion prediction error in a bottom-to-bottom field path supplied from the motion vector detector 162 to the field/frame determining circuit 170 and the adder 168. The adder 168 adds the motion detection errors in the fields outputted from the first and second multiplexors 164 and 166 and outputs the added motion detection error to the field/frame determining circuit 170. The field/frame determining circuit 170 compares a motion detection error in the frame path outputted from the motion vector detector 162 with a motion detection error in the field path outputted from the adder 168 to thereby select and output the vector having the smaller motion detection error value.

As a result, it is to be understood that, assuming that the motion prediction in a half pixel unit at the second motion estimator 160 is one layer, a hierarchical motion prediction technique having five steps as a whole is implemented. In this case, when all the motion prediction for the field/frame paths are carried out as shown in FIG. 16 so as to arrange a reduction effect in a calculation amount that can be obtained by the motion prediction method according to the third embodiment of the present invention, a calculation amount required by the hierarchical retrieval method is given the following formula:

$$C_{proposed} = 2 \times \left(2 \times \frac{N_B}{8}\right)^2 \times \left(\frac{2S}{8}\right)^2 \times M + 3 \times \left(\frac{N_B}{4}\right)^2 \times 5^2 \times M + \qquad (13)$$

$$3 \times \left(\frac{N_B}{2}\right)^2 \times 5^2 \times M$$

$$= \left(\frac{1}{128} \times S^2 + \frac{1}{16} \times 25 + \frac{3}{4} \times 25 + 3 \times 25\right) N_B^2 \times M$$

Further, assuming that $C_{FSBMA}$ is a calculation amount required in the entire area retrieval algorithm, a reduction effect in the calculation amount that can be obtained when the entire area retrieval algorithm is replaced by the hierarchical block matching algorithm can be expressed as the following formula:

$$\frac{C_{proposed}}{C_{FSBMA}} = \frac{\left(\frac{1}{128} \times S^2 \times \frac{1}{16} \times 25 + \frac{3}{4} \times 25 + 3 \times 25\right)}{4S^2} \qquad (14)$$

$$= \frac{1}{512} + \frac{75}{64S^2} + \frac{75}{16S^2} + \frac{75}{4S^2}$$

Since the size S of the motion retrieval area applied to the general MPEG-2 image is more than 32, the calculation amount is reduced to $\frac{1}{512}$ as seen from the formula (14).

FIG. 17 represents a motion prediction method according to a fourth embodiment of the present invention step by step.

In FIG. 17, the motion prediction method is to obtain a single motion vector having a minimum error for each layer and deliver the vector to the next layer for the purpose of a retrieval in the next step. Further, such a motion prediction method may be expanded to a general scheme that allows a plurality of motion vectors to be selected so as to raise an accuracy of retrieval and then allows them to be retrieved in the next step again. In this case, in the process of selecting a plurality of motion vectors at each layer, the plurality of motion vectors are selected in the sequence of increasing in the mean absolute difference(MAD) value starting from a motion vector in which the corresponding MAD has the smallest value. More specifically, as shown in FIG. 17, N0 motion vectors are detected in the sequence of having a smaller MAD value from a retrieval position(or point) in the lowermost layer(i.e., layer 0). Then, N1 positions having the smallest MAD value in (5×5)×N0 retrieval positions generated by the local retrieval at the layer 1 is detected and supplied to the layer 2. Next, N2 retrieval points is selected and supplied to the layer 3 at the layer 2. Then, a single motion vector is found by means of the (5×5)×N0 times local retrieval at the layer 3.

In this case, when a method of selecting only a optimum motion vector for each layer is used, that is, when each of the N0, N1 and N2 is set to 1, it has an advantage in that the hardware implementation is very easy; while, when the N0, N1 and N2 are set to multiple values, it has an advantage in that, a somewhat increase in the complication of the hardware is caused, but an accuracy of the motion prediction is improved as much.

As a result, the motion prediction methods according to the third and fourth embodiments of the present invention reconstruct a unit image into the four layer hierarchical structure to carry out a prediction operation for a motion in a single pixel unit using the hierarchical block matching algorithm, thereby reducing the calculation amount required in the motion prediction process without any deterioration in the motion prediction performance.

As described above, the motion prediction method and apparatus according to the present invention is capable of considerably reducing the input/output band width by compatibly performing the lowermost layer retrieval and the half-pixel retrieval when the hierarchical algorithm is used. Also, the motion prediction methods according to another embodiment of the present invention reconstruct a unit image into the four-step hierarchical structure to carry out a prediction operation for a motion in a single pixel unit using the hierarchical block matching algorithm, thereby reducing the calculation amount required in the motion prediction process without any deterioration in the motion prediction performance.

Although the present invention has been explained by the embodiments shown in the drawings described above, it should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A motion prediction apparatus, comprising:

coding means connected to an input line for coding an input image;

decoding means connected to the coding means for decoding the coded image signal; and first motion estimating means connected commonly to the input line and the decoding means for retrieving a motion in a single pixel unit repeatedly in accordance with a position information detected dependently at m layers with respect to the input image and for generating a second position information at the (m−1) numbered layer;

second motion estimating means connected commonly to the decoding means and the first motion estimating means for estimating a motion in a single pixel unit with respect to a decoded reconstructed image at the m numbered layer in accordance with the second position information to generate a third position information, said m being an integer; and third motion estimating means connected commonly to the second motion estimating means and the decoding means for estimating a motion in a half pixel unit with respect to the decoded reconstructed image at the m numbered layer in accordance with the third position information, wherein the decoded reconstructed image is loaded once and used by both the second and third motion estimating means.

2. The motion prediction apparatus as claimed in claim 1, wherein the second motion estimating means includes:

first storage means connected to the decoding means for storing the decoded reconstructed image in the m numbered layer;

second storage means for storing a retrieval data to do the retrieval in a half pixel unit and in a single pixel unit;

arithmetic means connected commonly to the first and second storage means for calculating an average value with respect to the reconstructed image in a specified area;

comparing means connected to the arithmetic means for generating a smallest value of the average value as a position information; and address generating means connected commonly to the comparing means and the first storage means for applying an address signal according to the position information to the first storage means.

3. The motion prediction apparatus as claimed in claim 2, wherein the third motion estimating means includes:

storing means connected to the first storage means for receiving and storing a portion of the decoded reconstructed image of the m layer according to the address signal;

interpolating means connected to the first storage means for signal-interpolating the decoded reconstructed image into a reconstructed image for a retrieval area in a half pixel unit;

arithmetic means connected commonly to the second storing means and the interpolating means for calculating an average value with respect to the reconstructed image; and comparing means connected to the arithmetic means for generating a smallest value of the average value as a position information.

4. A motion prediction apparatus, comprising:

coding means connected to an input line for coding an input image;

decoding means connected to the coding means for decoding the coded image signal;

first motion estimating means connected commonly to the input line and the decoding means for retrieving a motion in a single pixel unit repeatedly in accordance with a position information detected dependently at m layers with respect to the input image and for generating a second position information at the (m−1) numbered layer; and second motion estimating means connected commonly to the decoding means and the first motion estimating means for estimating a motion in a half pixel unit with respect to a decoded reconstructed image in the m numbered layer at a retrieval area including a retrieval region in a single pixel unit and a retrieval region in a half pixel unit in the m numbered layer in accordance with the second position information, said m being an integer, wherein the decoded reconstructed image at the m layer is input once in the second motion estimating means.

5. The motion prediction apparatus as claimed in claim 4, wherein the second motion estimating means includes:

storage means connected to the decoding means for storing the decoded reconstructed image at the m layer;

interpolating means connected to the storage means for signal-interpolating the decoded reconstructed image at the m layer into a reconstructed image for the retrieval area including the retrieval region in a single pixel unit and the retrieval region in a half pixel unit;

arithmetic means connected commonly to the interpolating means for calculating an average value with respect to the reconstructed image and the input image; and comparing means connected to the arithmetic means for generating a smallest value of the average value as a position information.

6. A motion prediction method, comprising:

retrieving a motion in a single pixel unit repeatedly in accordance with a position information detected dependently at m layers with respect to an input image to generate a position information at the (m−1) numbered layer;

coding and decoding the input image; and retrieving a motion in a single pixel unit and a motion in a half pixel unit at the m numbered layer with respect to a single decoded reconstructed image at the m layer in accordance with the position information, said m being an integer, wherein the single decoded reconstructed image is loaded only once for the retrieving the motion in both the single pixel unit and the half-pixel unit.

7. A motion prediction method comprising:

retrieving a motion in a single pixel unit repeatedly in accordance with a position information detected dependently at m layers with respect to an input image to generate a first position information at the (m−1) numbered layer;

coding and decoding the input image;

loading a single bottom layer reconstructed image only once; and estimating a motion in a half pixel unit at a retrieval area including a retrieval region in a single pixel unit and a retrieval region in a half pixel unit in the m numbered layer in accordance with the first position information relative to the input image and the single bottom layer reconstructed image.

8. The motion prediction method as claimed in claim 7, wherein retrieval points for the retrieval at the m numbered layer and in a half pixel unit have 81 points around a specified position according to the first position information.

9. The motion prediction method as claimed in claim 8, wherein the number of retrieval points is selectively variable.

10. A motion prediction method of performing a motion prediction by dividing a hierarchical structure in coding an input image, comprising:

detecting an initial motion vector in a single pixel unit with respect to a block having a size larger than a reference block at a layer having the smallest retrieval area;

estimating a motion in a single pixel unit with a predetermined size of local area around the initial motion vector at the next low-order layer and then estimating a motion in a single pixel unit repeatedly for each layer in the similar manner, to thereby detect a final single-pixel motion vector at the lowermost layer; and retrieving a decoded image around the single pixel motion vector detected in the detecting process to thereby estimate a motion in a half pixel unit, wherein the final single-pixel motion vector at the lowermost level and a corresponding half-pixel unit motion vector are determined using a single reference image loaded only once.

11. A motion prediction method of performing a motion prediction by dividing a hierarchical structure in coding an input image, comprising:

(A) detecting n initial motion vectors in a single pixel unit with respect to a block having a size larger than a reference block at a bottom layer having the smallest retrieval area;

(B) selecting m numbers (wherein m is less than n) in a sequence of a position having a smaller average absolute error in retrieval positions generated by the n times local retrieval at the next low-order layer and repeating the selection for each layer in the similar manner, to thereby finally detect one single-pixel motion vector at a layer directly above the bottom layer, said m and n being an integer; and (C) estimating a motion in the bottom layer for a single pixel unit and estimating a motion in the bottom layer for a half pixel unit around the bottom layer single-pixel motion vector both using a single decoded image of the bottom layer loaded only once.

12. The motion prediction method as claimed in claim 11, wherein the estimating a motion in the bottom layer comprises:

storing the single decoded image of the bottom layer in a first storage device;

storing a retrieval data to do the retrieval in a single pixel unit in a second storage device;

arithmetically calculating an average value with respect to the single decoded image of the bottom layer in a specified area for the single pixel unit retrieval data at a plurality of points;

comparing the average values to select a smallest value as a position information; and applying an address signal according to the position information to the first storage device.

13. The motion prediction method as claimed in claim 12, wherein third motion estimating includes:

signal-interpolating the single decoded image of the bottom layer into a reconstructed image for the retrieval area in a half pixel unit;

arithmetically calculating an average value with respect to the reconstructed image in a specified area and the half pixel retrieval data at a plurality of points; and comparing the average values to select a smallest value as a final motion vector.

* * * * *